United States Patent [19]
Slater

[11] Patent Number: 5,755,062
[45] Date of Patent: May 26, 1998

[54] PORTABLE STRUCTURE FOR HOUSING SENSITIVE EQUIPMENT AND METHOD OF FABRICATING SAME

[76] Inventor: Electus P. Slater, 4626 Nottingham Rd., Jacksonville, Fla. 32210

[21] Appl. No.: 668,253

[22] Filed: Jun. 20, 1996

[51] Int. Cl.⁶ ............................................. E04H 1/12
[52] U.S. Cl. .................. 52/79.1; 52/265; 52/268; 52/745.05
[58] Field of Search ................... 52/79.1, 79.7, 52/79.9, 143, 309.7, 309.11, 407.3, 68, 745.01, 745.02, 745.05, 262, 264, 265, 267, 268, 269

[56] References Cited

U.S. PATENT DOCUMENTS

| | | |
|---|---|---|
| 1,100,804 | 6/1914 | White. |
| 2,677,571 | 5/1954 | Williams ................ 52/143 X |
| 3,044,540 | 7/1962 | Hammersley ............. 52/68 X |
| 3,123,186 | 3/1964 | Adkinson, Jr. et al.. |
| 3,267,626 | 8/1966 | Daly. |
| 3,305,986 | 2/1967 | Mathews. |
| 3,492,767 | 2/1970 | Pincus ................... 52/143 X |
| 3,498,011 | 3/1970 | Lindgren. |
| 3,633,324 | 1/1972 | Cuylits ................... 52/68 X |
| 3,667,172 | 6/1972 | Erickson ................. 52/143 X |
| 3,946,528 | 3/1976 | Jacobson et al.. |
| 4,014,143 | 3/1977 | Purcell. |
| 4,221,093 | 9/1980 | Crookston. |
| 4,394,809 | 7/1983 | Sherwood et al.. |
| 4,455,801 | 6/1984 | Merritt. |
| 4,615,166 | 10/1986 | Head .................... 52/309.11 |
| 4,805,357 | 2/1989 | Aleixo ................... 52/79.1 |
| 4,854,094 | 8/1989 | Clark. |
| 5,113,625 | 5/1992 | Davis .................... 52/143 |
| 5,315,794 | 5/1994 | Pearson ................. 52/79.1 |
| 5,560,150 | 10/1996 | Pearson ................. 52/143 X |

FOREIGN PATENT DOCUMENTS

| | | | |
|---|---|---|---|
| 1134409 | 12/1956 | France ................. 52/68 |
| 3329620 | 3/1985 | Germany ............... 52/143 |
| 559004 | 3/1957 | Italy ................... 52/68 |
| 607691 | 9/1960 | Italy ................... 52/68 |

OTHER PUBLICATIONS

Brochure entitled "The Phoenix Envirovault Offers the Ultimate Protection" (1992).

*Primary Examiner*—Michael Safavi
*Attorney, Agent, or Firm*—Armstrong, Westerman, Hattori, McLeland & Naughton

[57] ABSTRACT

A metallic structure having an inner and outer enclosure fastened to a skid base having an upper and lower deck. The inner and outer enclosures are made from steel sheets with stiffeners fastened to the inner surface of the outer enclosure and outer surface of the inner disclosure. The inner and outer stiffeners are offset from one another and extend into the space between the enclosures about on-half of the space width. Fire and impact resistance insulation is introduced into the space in liquid or slurry form to fill the space between the inner and outer enclosures.

17 Claims, 17 Drawing Sheets

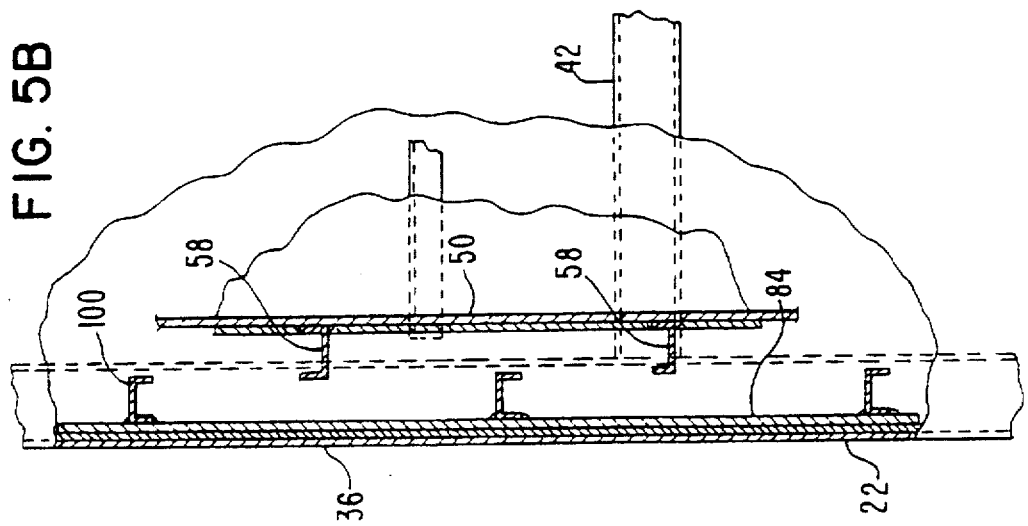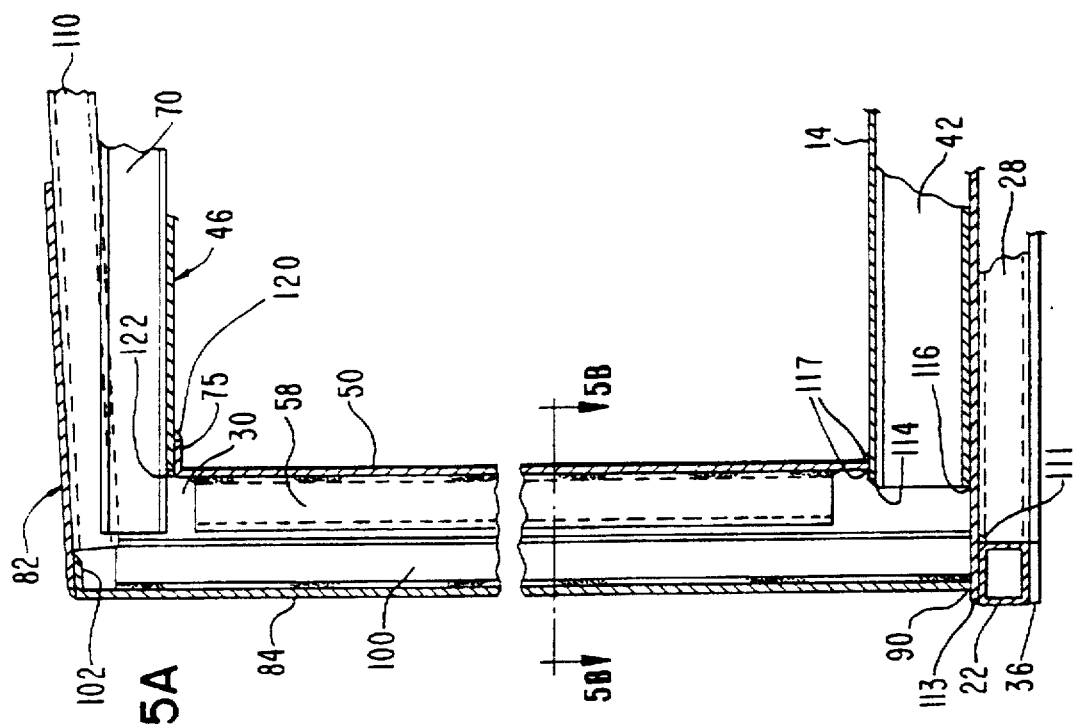

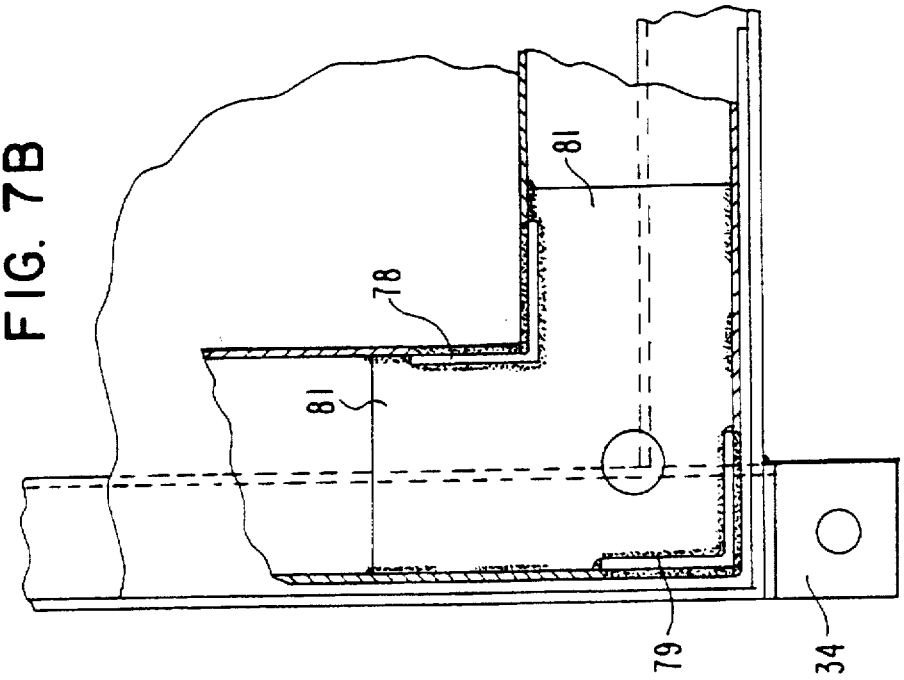
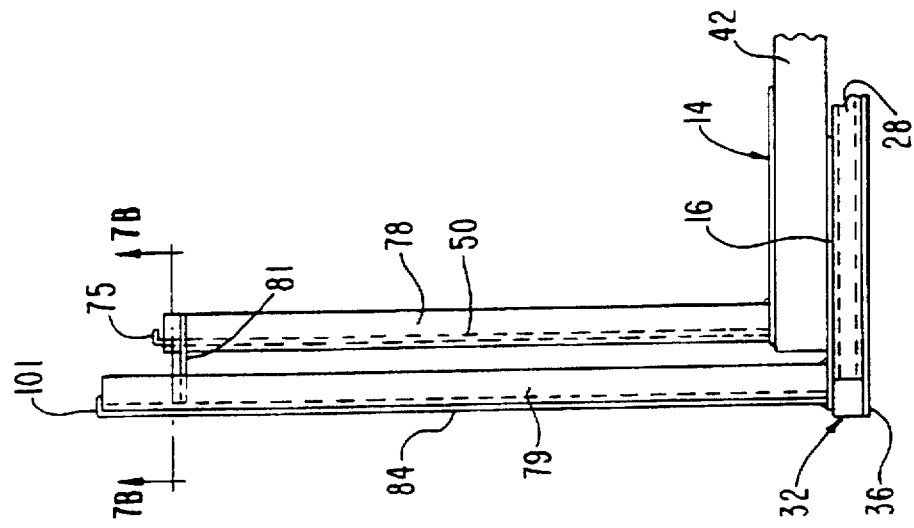

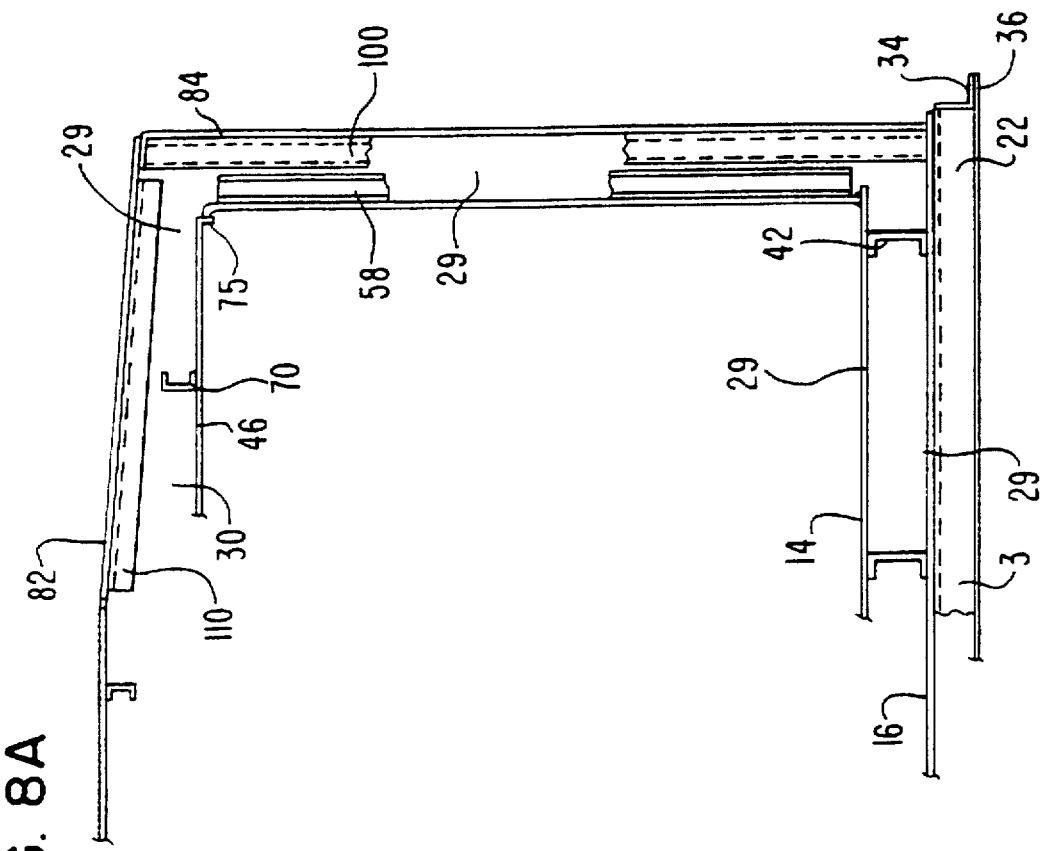
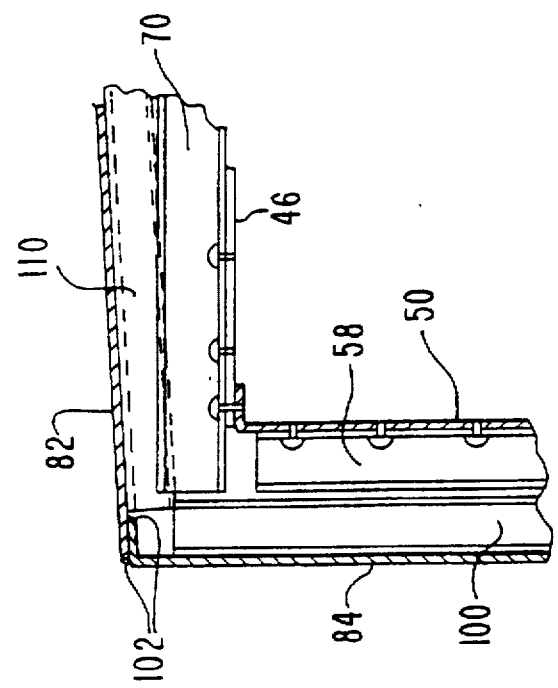

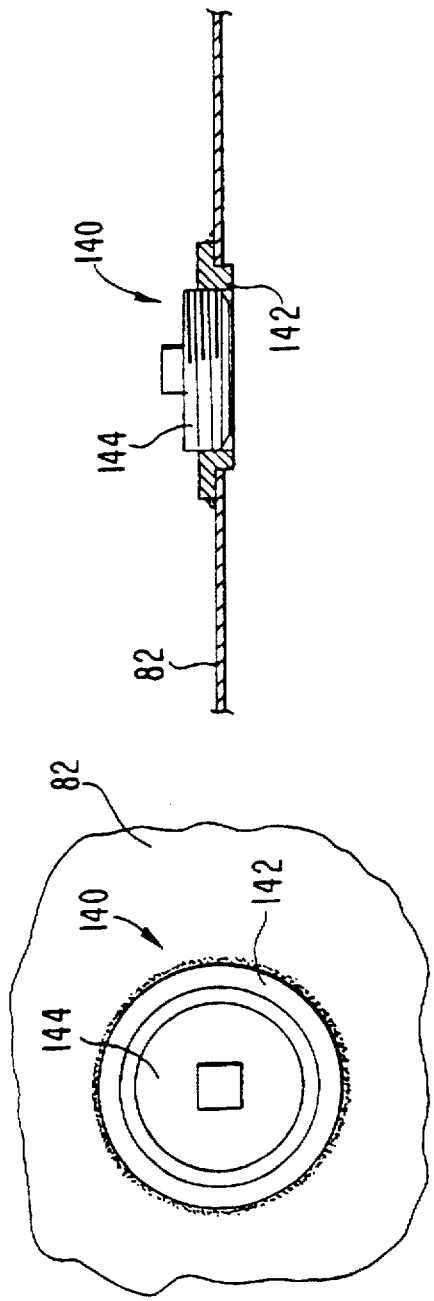

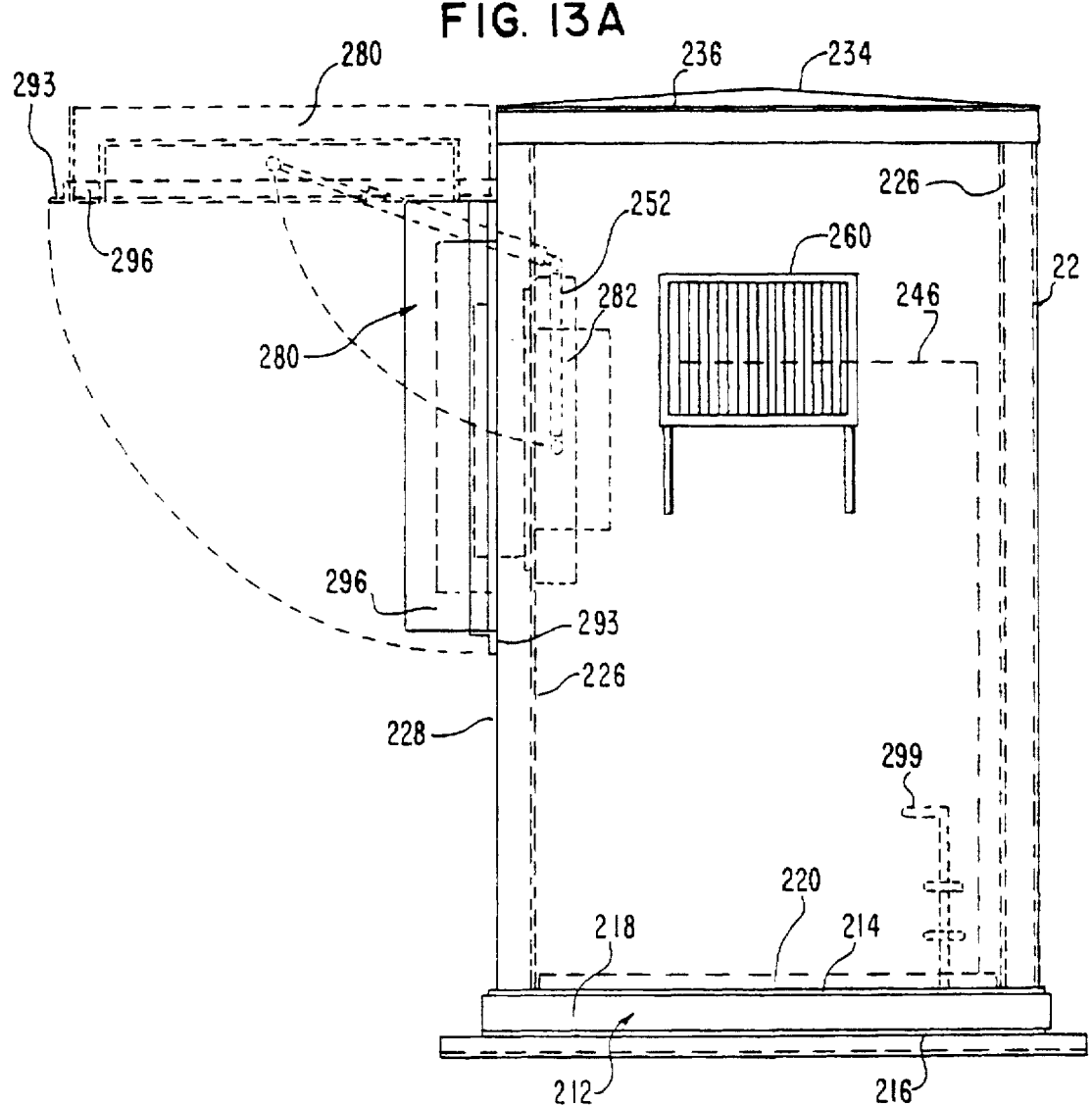
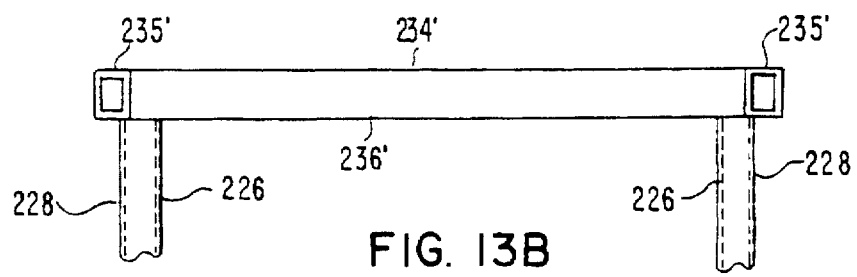

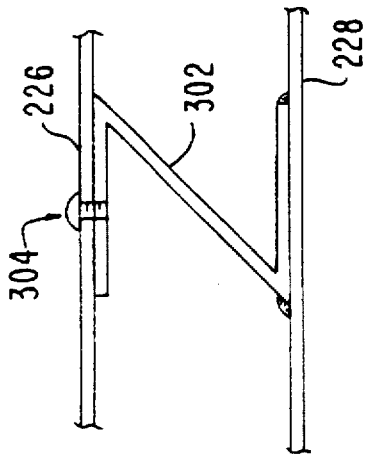
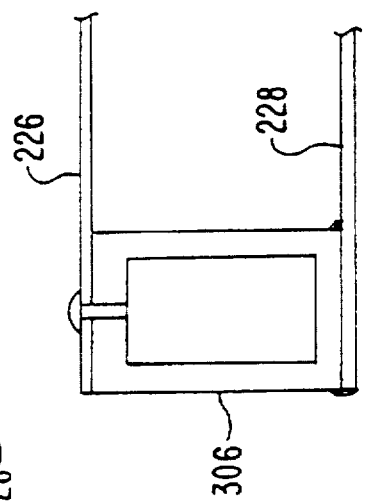
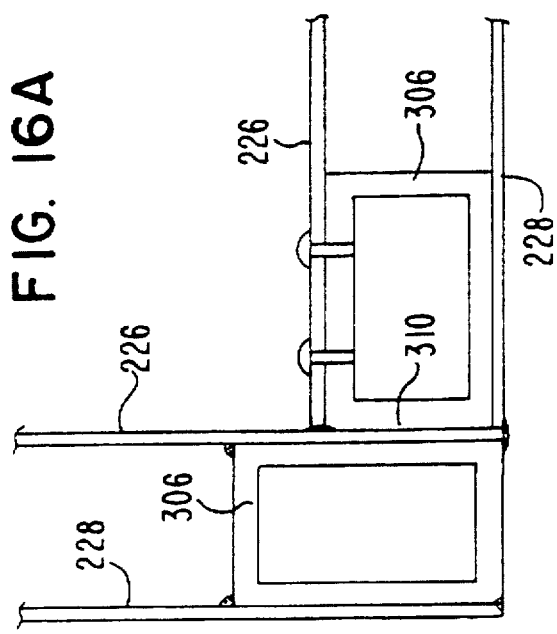

1

PORTABLE STRUCTURE FOR HOUSING SENSITIVE EQUIPMENT AND METHOD OF FABRICATING SAME

BACKGROUND OF THE INVENTION

1. Field of the Invention

The present invention relates to structures for housing sensitive equipment and method of making same; and more particularly, to portable structures for housing such equipment that are fire and bullet resistant.

Although suitable for housing many kinds of sensitive equipment where protection from the elements and vandalism is paramount, the present invention is particularly advantageous for housing telecommunications equipment used in cellular, satellite, and personal communication system base stations, and will be described in that connection.

2. Description of Related Art

With the advent of wireless telecommunication systems, such as cellular, satellite and personal communication systems, for example, it has become necessary to locate the base station equipment at specific geographic locations serviced by such systems. Initially, this base station equipment could be installed in large urban office buildings or in other secure urban locations. However, as the demand for larger coverage areas increased, it became necessary, particularly in sparsely populated regions, to install the required base station equipment in structures designed specifically for such purpose. These structures, which are either built at the desired location, or sometimes transported to the area not only must be fireproof, leakproof, impact resistant, and bullet proof, but also climate controlled to prevent the equipment from becoming disabled due to excessive humidity, heat, or cold. The buildings, which are built on site, are typically constructed of pre-cast concrete, which is prone to cracking and leaking, thus, requiring frequent inspections and maintenance. The buildings which are transported to the sight in either a fully or partially assembled state, are typically conventional sheet metal built on wooden or metal framing. Such sheet metal enclosures, although suitable for certain applications, offer little or no protection from fire, the elements, hunters' bullets or flooding, for example. Thus, such buildings for housing sensitive equipment, must either be erected at the site, which results in an extremely expensive endeavor particularly in remote locations, or if transportable, are usually ineffective in fully accomplishing their purpose, particularly over an extended period of time.

In light of the foregoing there is a need for a portable structure for housing telecommunication and other sensitive equipment that is resistant to fire, bullets, impact, vandalism, water, and the elements, in general, and yet is deliverable to the site in a relatively light weight, but erected condition.

SUMMARY OF THE INVENTION

Accordingly, the present invention is directed to a structure and method of manufacture that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the invention, as embodied and broadly described, the invention is a portable structure for housing sensitive equipment which includes a skid platform having metallic spaced upper and lower decks with opposite side edges and a forward and rear edge; an inner enclosure having an inner metallic skin, including a ceiling skin, opposite sidewall skins fastened to the ceiling skin along an upper edge and fastened to the deck along a lower edge, opposite end wall skins fastened to the ceiling skin along an upper edge and fastened to the upper deck along a lower edge, said sidewall and endwall skins of the inner enclosure being fastened to one another from the lower edge to the upper edge of the respective skins at adjoining corners. The structure also includes an outer enclosure having an outer metallic skin, including a roof skin, opposite outer sidewall skins fastened along the roof skin at an upper edge and fastened to the lower deck along a lower edge, opposite outer end wall skins fastened to the roof skin along an upper edge and fastened to the lower deck along a lower edge, enclosing and spaced from the ceiling skin. The inner sidewall skins and the inner end wall skins of the inner metallic enclosure are fastened to one another along adjoining corners extending from the lower edge to the upper edge of the respective skins. The sidewall and endwall skins of the outer enclosure are fastened to one another along adjoining corners extending from the lower edge to the upper edge of the respective skins. The inner and outer enclosures have stiffening means for stiffening the inner and outer skins independently of one another, including first means mounted to the inner metallic skins in the space between the inner and outer enclosures for stiffening the inner metallic skins; second means mounted to the outer metallic skins in the space between the inner and outer enclosures and offset from the inner stiffening means for stiffening the outer metallic skins; and barrier material occupying the space between the inner and outer metallic enclosures and upper and lower decks.

In another aspect, the invention is a method of fabricating a portable structure for housing sensitive equipment having an inner metallic enclosure comprised of sidewall skins, endwall skins, and a ceiling skin; an outer metallic enclosure comprised of sidewall skins, endwall skins, and a roof skin, said method comprising the steps of assembling upper and lower spaced decks for supporting the building, said lower deck having a configuration and dimensions corresponding to the configuration and dimensions of the outer enclosure, said upper deck having a configuration similar to and dimensions smaller than the lower deck corresponding to the configuration and dimensions of the inner enclosure; stiffening the metallic ceiling, the sidewall skins and the endwall skins of the inner enclosure with elongate metallic members spaced from one another and fastened along the outer surface of the inner sidewall and endwall and roof skins; fastening the ceiling and sidewall and endwall skins to one another along and adjacent to their edges to form the inner enclosure; stiffening the outer metallic sidewall and endwall skins and roof skin with elongate members spaced from one another at locations to be offset from the elongate members of the inner enclosure when the inner and outer enclosures are assembled, said elongate members being fastened to the inner surface of the sidewall and endwall and roof skins; fastening the roof skin and outer wall skins to one another adjacent to and along their edges to form the outer enclosure; fastening lower edges of the inner sidewall and endwall skins along the upper deck to fasten the inner enclosure to the upper deck; enclosing the inner enclosure with the outer enclosure to align the lower edges of the outer sidewall and endwall skins adjacent the peripheral edge of the lower; and fastening the lower edge of the outer wall skins along the lower deck to fasten the outer enclosure to the lower deck; and filling the space between the inner and outer enclosures with barrier insulation.

In still another aspect, the invention is directed to a portable structure for housing telecommunications equipment that includes a skid platform having metallic spaced upper and lower decks with opposite side edges and a forward and rear edge; an inner enclosure including the skid platform having an inner metallic skin, with opposite sidewall skins fastened to one another; an outer enclosure having an outer metallic skin, including a roof skin, opposite outer sidewall skins, and the skid platform fastened together and covering and spaced from the inner enclosure to form a double walled enclosure; means mounted to the inner and outer metallic skins in the space between the inner and outer enclosures for stiffening the inner and outer metallic skins of the double walled enclosure; a partition fastened to the opposite inner sidewall skins intermediate the ends of the double walled enclosure to define a battery room on one side of the partition and a telecommunication equipment room at the other side of the partition; the opposite sidewalls of the double walled enclosure being open substantially the full length and height of the defined telecommunication equipment room; a first double walled door covers a portion of the opening the full length of the equipment room, said first door being hinged at an upper edge to swing to swing outward and upward about a horizontal axis to an open position, a pair of double walled doors each hinged to swing about a vertical axis covering the remaining portion of each of the openings, said doors extending outward at opposite ends of the equipment room substantially aligned with opposite side edges of the first double walled door when open, said doors when open defining a shelter on opposite sides of the double walled enclosure for accessing electronic equipment; and insulating material occupying the space between the inner and outer metallic enclosures.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF DRAWINGS

FIG. 5A is a fragmentary sectional view of the structure of FIG. 1 taken at line 5—5 of FIG. 1 and looking in the direction of the arrows;

FIG. 5B is a fragmentary sectional view taken at line 5B—5B of FIG. 5A;

FIG. 7A is a fragmentary sectional view taken at lines 7—7 of FIG. 1 and looking in the direction of the arrows;

FIG. 7B is a fragmentary enlarged sectional view taken at lines 7B—7B of FIG. 7A.

FIG. 8A is a fragmentary sectional view in elevation illustrating welded members and one embodiment of roof line construction in accordance with the present invention, and taken at 8—8 of FIG. 1 and looking in the direction of the arrows;

FIG. 8C is a fragmentary view similar to FIG. 6A, which illustrates a bolted construction of the inner enclosure according to the present invention;

FIG. 9A is an enlarged fragmentary view of the roof of FIG. 1 illustrating the plugged opening for injecting the barrier material between the inner and outer enclosure;

FIG. 9B is a sectional view taken at line 9—9 of FIG. 1 and looking in the direction of the arrows;

FIG. 13A is a view in elevation of the right end of the structure as viewed in FIGS. 11 and 12;

FIG. 13B is a fragmentary view illustrating a modification in the roof construction of FIG. 13A;

FIG. 16A is a fragmentary sectional view showing one embodiment of a bolted and welded corner joint of the structure of FIG. 11;

FIG. 16B is a fragmentary sectional view showing one variation of an end construction of an inner and outer skin of the structure of FIG. 11; and FIG. 16C is a fragmentary sectional view showing a Z bar stiffening and connecting an inner and outer skin of the structure of FIG. 11.

DESCRIPTION OF THE PREFERRED EMBODIMENT

Figure 1:
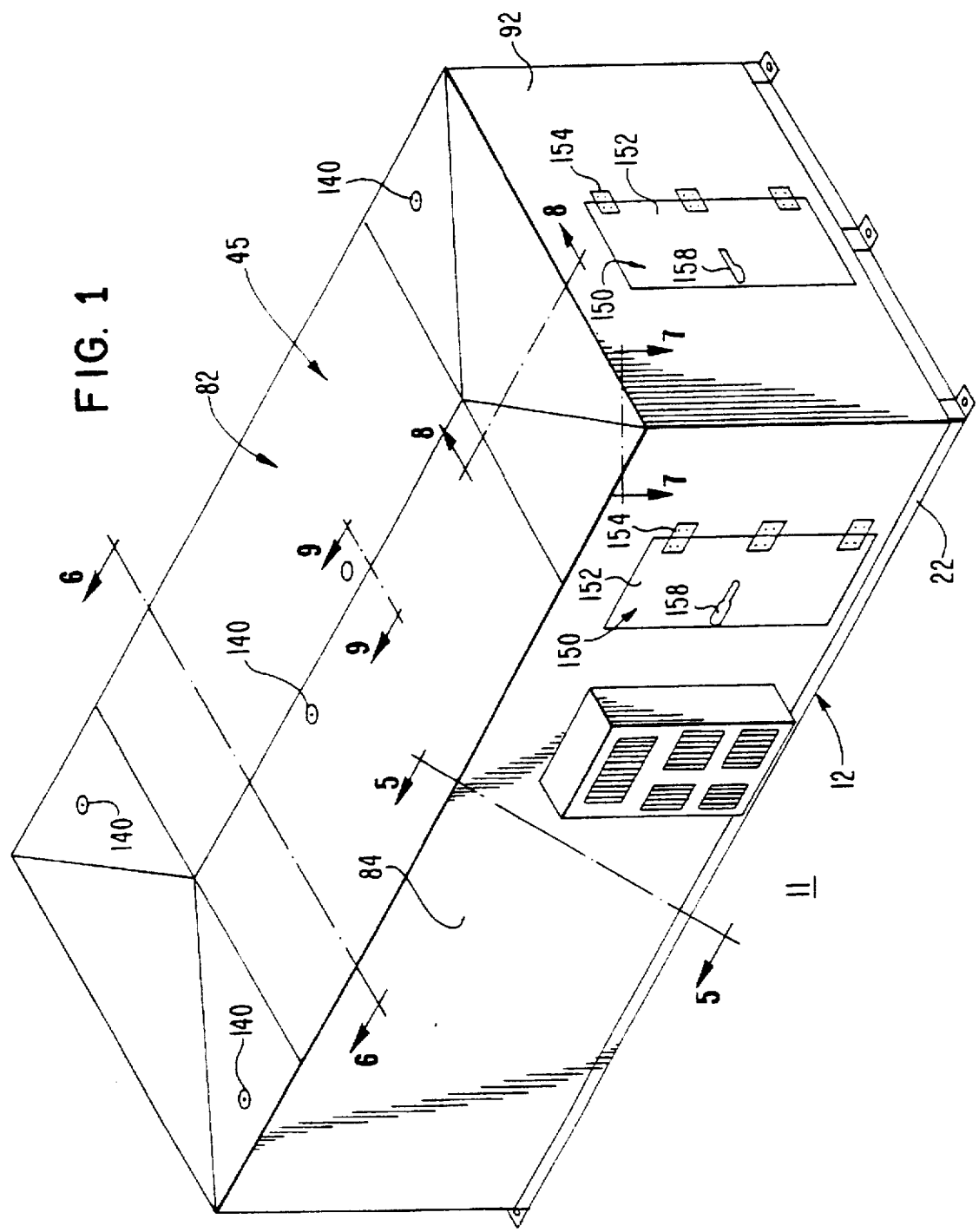
FIG. 1 is a view in perspective of a first embodiment of a structure for housing sensitive equipment in accordance with the present invention.

Reference will now be made in detail to the present preferred embodiments of the invention, examples of which are illustrated in the accompanying drawings, where like reference characters refer to like parts throughout the Figures.

In accordance with the present invention a portable structure for housing sensitive equipment comprises a skid platform having metallic spaced upper and lower decks, and an inner and outer metallic enclosure mounted on the respective upper and lower decks.

An exemplary embodiment of the structure of the present invention is shown in FIG. 1 and is designated generally by reference numeral 11. For some applications of the invention, a substantially all welded construction is preferred, for other applications a mechanical, such as a bolted, riveted or other types of fasteners are preferred, and for still other applications a combination of welded and mechanical fastener construction is preferred. With the exception of FIGS. 8C, 16A, 16B, and 16C, which are included to illustrate examples of mechanical fastener construction, the first and second embodiments of the invention are illustrated and described as having an all welded construction.

Figure 2:
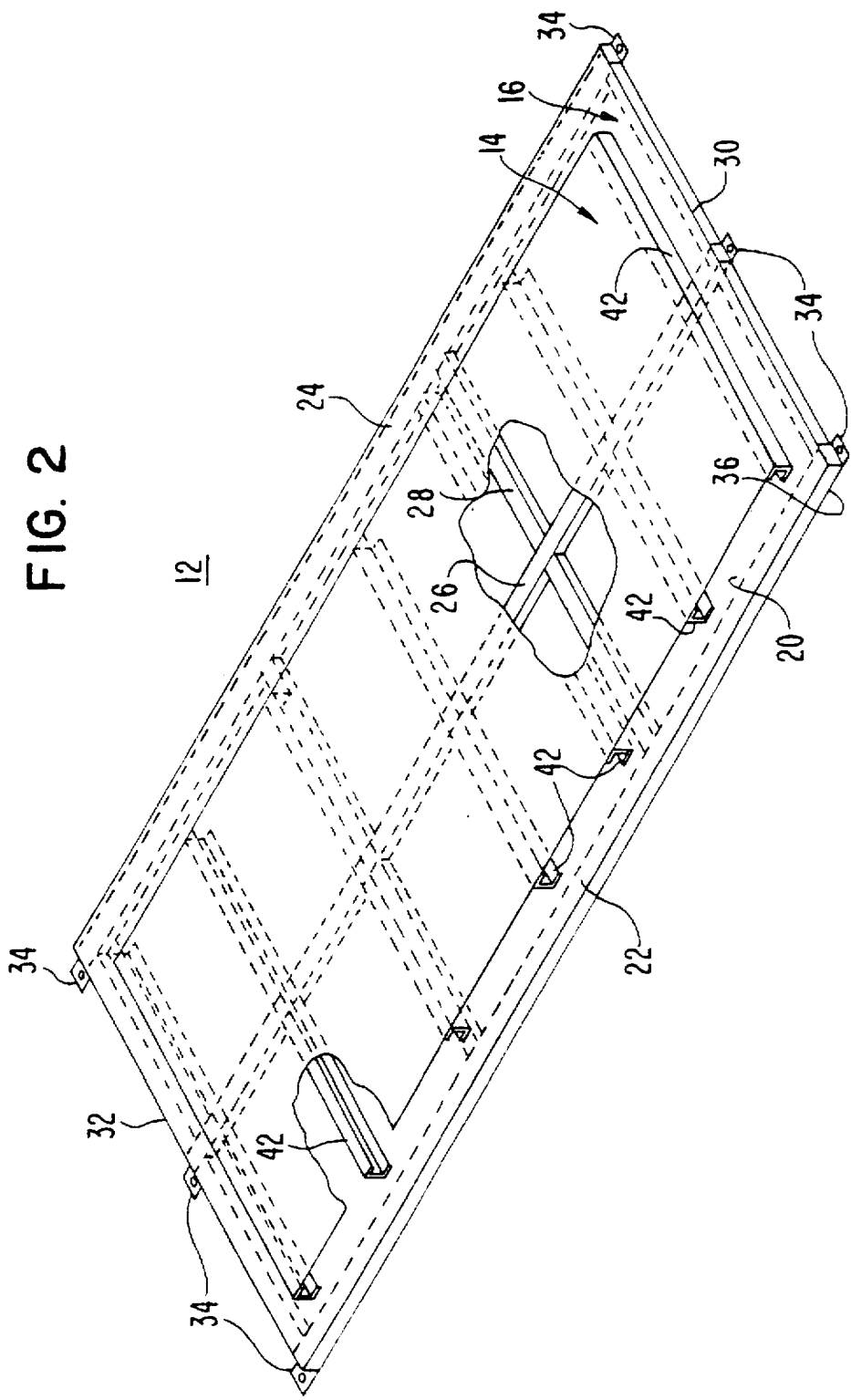
FIG. 2 is three dimensional view of a skid base for the structure of FIG. 1 in accordance with the present invention.

As embodied herein and referring to FIGS. 1 and 2, the portable building 11 includes a skid platform 12 having metallic spaced upper and lower decks 14 and 16, respectively. The lower metallic plate or deck 16 has a bottom surface 18 and a top surface 20 with a thickness preferably of approximately one quarter inch. A pair of longitudinally extending steel tubes 22 and 24, preferably having a dimension of 3×4×5/16 inches, for example, are fastened to the bottom surface of said plate 16 and define opposite side edges of the platform 12. A third longitudinally extending steel tube 26 is fixed to the bottom surface 18 of the plate 16 and is positioned intermediate and parallel to the pair of steel tubes 22 and 24. A plurality of laterally extending steel tubes 28 are spaced in a longitudinal direction between the forward edge 30 and a rear edge 32 on opposite sides of the third steel tube 26. An angle clip 34 is attached to each end of the pair and third longitudinal tubes 22, 24, and 26 for securing the structure to a concrete base. An insulation strip 36, such as neophrene, is fastened to an underside of each of said longitudinal tubes 22, 24, and 26 and lateral tubes 28 and angle clip 34 to insulate the building 11 from ground.

The configuration and dimensions of the lower deck 16 correspond to the configuration and dimensions of the completed structure 11. The upper metallic plate or deck 14, may have a thickness less than the lower metallic plate 16. The upper metallic plate 14 has a longitudinal and lateral dimension less than the corresponding dimensions of the lower deck by an amount corresponding to the space between inner and outer sidewall and endwall skins hereinafter described. It is contemplated that the metal used to fabricate the structure 11 may be carbon steel, stainless steel, aluminum, or galvanized carbon steel, for example.

A plurality of laterally extending longitudinally spaced metallic stiffening members 42 are positioned between and mounted to the bottom surface 40 of the upper metallic plate 14 and the top surface 20 of the lower deck 16. The plurality of stiffening members 42 have a length dimension corresponding to the width dimension of the upper deck 14. The upper deck 14 is mounted centrally above and spaced from said lower deck 16. The stiffening members 42 are dimensioned in depth to provide a space between the upper and lower decks preferably corresponding to the space between the sidewalls and endwalls of the inner and outer enclosures for insulation material 29. In one actual reduction to practice the upper deck 14 was made of a steel plate that is 3/16" thick, and the lower deck 16 was made of a steel plate that is 1/4" thick.

In accordance with the present invention, the structure has an inner enclosure with an inner metallic skin, including a ceiling skin, opposite planar inner sidewall skins fastened to the ceiling skin at an upper edge and fastened to the upper deck at a lower edge, opposite end wall skins fastened to the ceiling skin along an upper edge and fastened to the upper deck along a lower edge.

Figure 3:
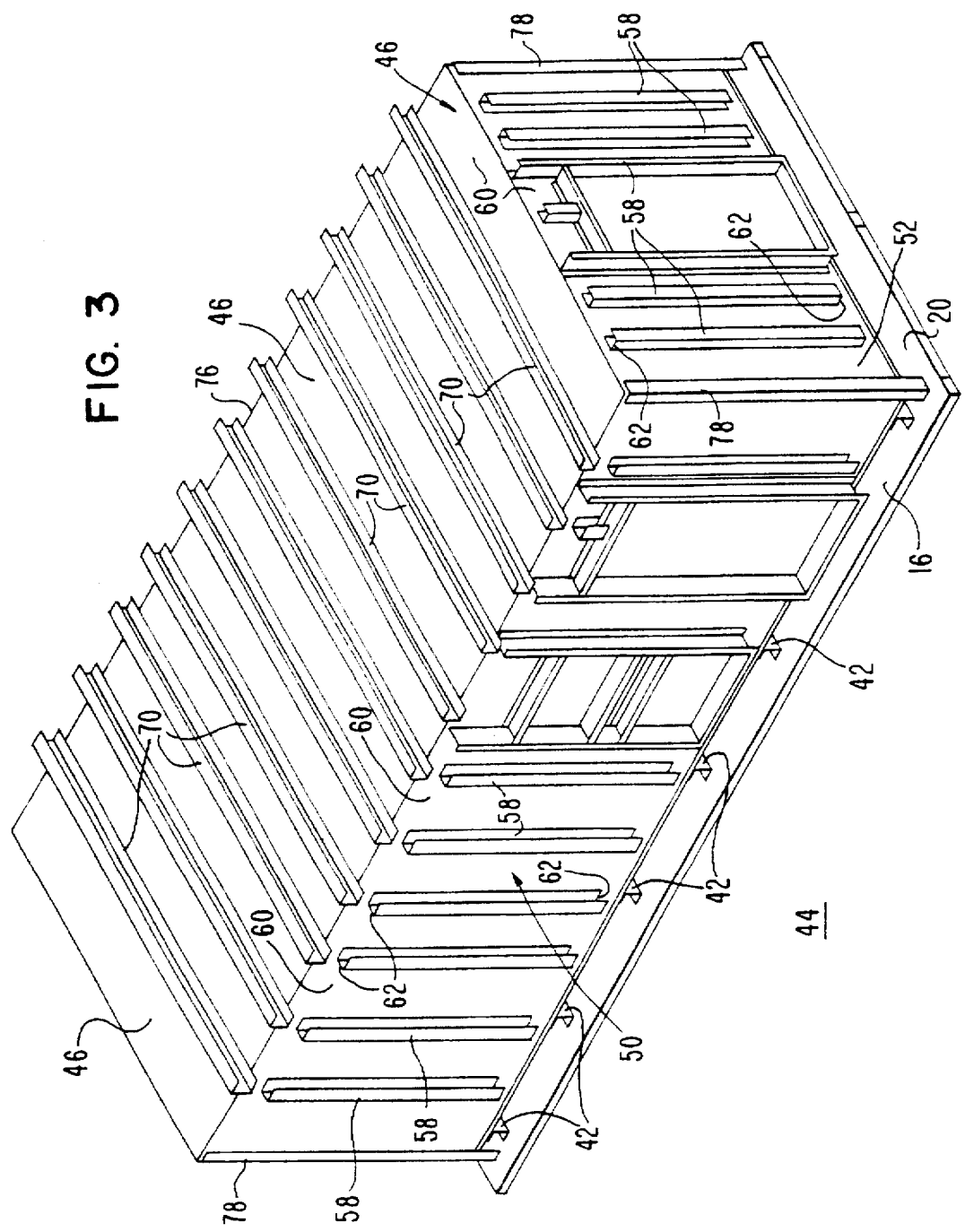
FIG. 3 is a three dimensional view of an inner enclosure for the structure of FIG. 1 in accordance with the present invention.

As herein embodied and referring to FIG. 3, an inner enclosure generally referred to as 44 has an inner planar ceiling skin 46, opposite planar sidewall skins 50 and endwall skins 52 welded at their upper edges to corresponding longitudinal and lateral edges of the ceiling skin 46, and welded at adjacent edges to each other to form corners of the inner enclosure 44. The sidewall and endwall skins 50 and 52 are welded by a continuous seam weld at their lower edges adjacent to corresponding longitudinal and lateral edges of the upper deck 14.

In accordance with the present invention, the inner enclosure 44 includes first means mounted to the inner metallic skins in the space between the inner and outer enclosures for stiffening the inner metallic skins independently of the outer metallic skins.

As embodied herein and again referring to FIG. 3, a plurality of vertically extending longitudinally spaced metallic stiffening members 58 are mounted to outer surfaces 60 of the inner sidewall and endwall skins 50 and 52, said stiffening members 58 each having opposite ends 62 terminating inwardly of the upper and lower edges of the sidewall skins 50 and endwall skins 52 and a depth dimension approximately one-half the width of the space between the inner enclosure 44 and outer enclosure 45 (to be described) when fully assembled. A plurality of laterally extending longitudinally spaced metallic stiffening members 70 are fastened to the outer surface of the planar ceiling skin 46 and overhang opposite side edges of the ceiling skin 46 and the opposite inner sidewall skins 50 and 52 a distance corresponding to approximately the depth of the vertical sidewall stiffening members 58. Inner enclosure corner supports 78 are attached to the outer surface 60 of the sidewall and endwall skins 50, 52 at each corner of the inner enclosure 44. Each of the plurality of attached corner supports 78 has one end attached to the top surface 20 of the lower deck 16, and the opposite end terminating adjacent of the upper edge of the inner sidewall skins 50.

In accordance with the present invention, the structure 11 includes an outer enclosure having outer metallic skins, including a roof skin, opposite outer planar sidewall skins fastened to the roof skin along their upper edges and fastened to the lower deck along their lower edges, opposite outer end wall skins fastened to the roof skin along their upper edges and fastened to the lower deck along their lower edges enclosing and spaced from the inner enclosure, including the planar ceiling skin, the opposite inner planar sidewall skins, and the opposite inner end wall skins, respectively.

Figure 4:
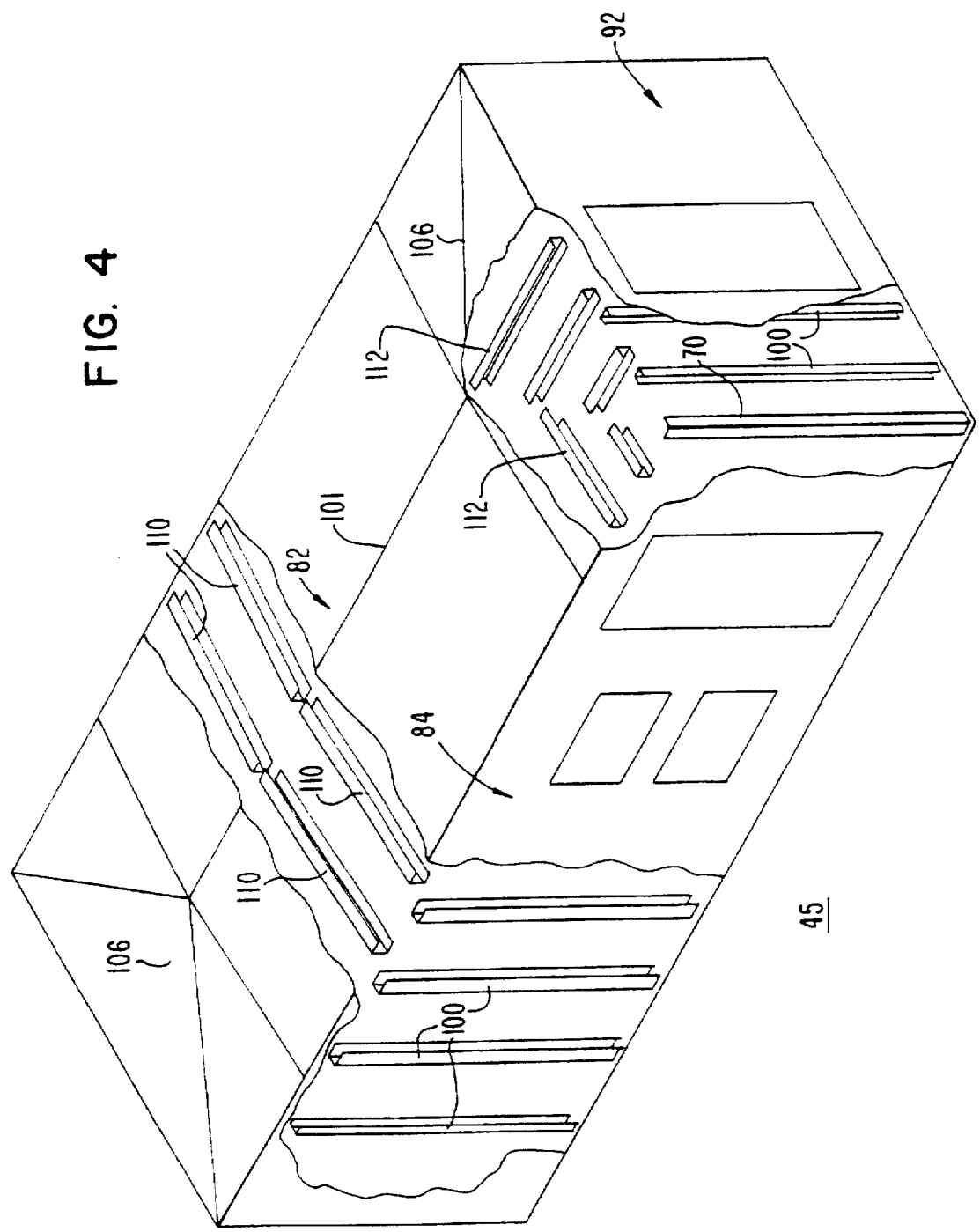
FIG. 4 is a three dimensional view of an outer enclosure with parts broken away to show the interior thereof for the structure of FIG. 1 in accordance with the present invention.

As herein embodied and referring to FIG. 4, outer enclosure 45 has a roof skin 82, opposite outer planar sidewall skins 84 welded to the roof skin 82 at an inwardly extending bent flange at their upper edges and welded to the lower deck 16 at their lower edges. Opposite outer end wall skins 92 are welded to the roof skin 82 at an inwardly extending flange, at their upper edges and welded to the lower deck 16 at their lower edges 98. Thus, the outer enclosure 45 completely encloses the inner enclosure 44. The outer roof skin 82 is spaced from the inner planar ceiling skin. The opposite outer planar sidewall skins 84 are spaced from the inner sidewall skins 50, and the opposite outer endwall skins 92 are spaced from the inner endwall skins 52.

In accordance with the invention, the outer enclosure and inner enclosure are supported relative to one another at the skid base and corner tie plates. As herein embodied, the upper deck 14 is welded adjacent to and along its edges to the inner sidewalls 50 and endwalls 52, and the lower deck 16 is welded along the edge of the outer sidewalls 84 and endwalls 92, adjacent the edges of the lower deck 16. An outer corner support 79 is welded to the inner surface of the outer enclosure 45 at each corner thereof. A flat column tie plate 81 having a general dog leg configuration with a central hole therein is welded in the space between the inner and outer enclosures adjacent the top edge of the corner supports 78 and 79.

The structure of the present invention includes second means mounted to the outer metallic skins in the space between the inner and outer enclosures and spaced from the inner stiffening means for stiffening the outer metallic skins independently and apart from the inner enclosure.

As embodied herein and referring to FIG. 4 a plurality of vertically extending longitudinally spaced metallic u-shaped stiffening members 100 are mounted to the inner surface of the outer sidewall and endwall skins 84 and 92, respectively. The plurality of outer metallic stiffening members 100 have one end terminating at the top surface of the lower deck 16 and another end terminating inwardly of the upper edge of the outer sidewall skins 84 and endwall skins 92. The outer enclosure stiffening members 100, which are fastened to the outer sidewalls preferably by one of the legs of their U-shape, have a depth of approximately one-half the width of the space between the inner and outer enclosure, and are offset from the inner stiffening members to avoid restrictions having a width less than one-half the width of the intervening space.

The structure of the present invention includes a roof skin with lower longitudinally extending edges fastened to an inwardly extending flange of the outer sidewall and endwall skins.

Figure 6B:
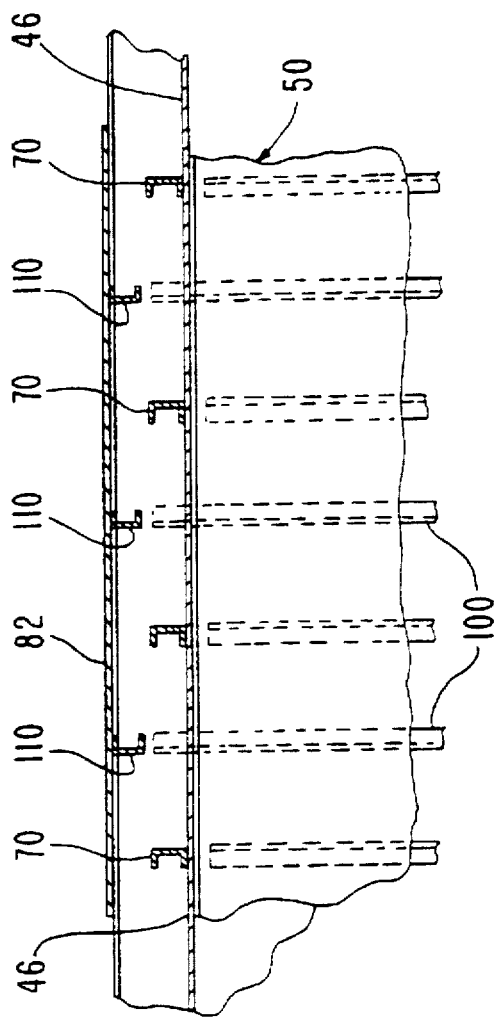
FIG. 6B is a fragmentary sectional view taken at lines 6B—6B of FIG. 6A.
Figure 6A:
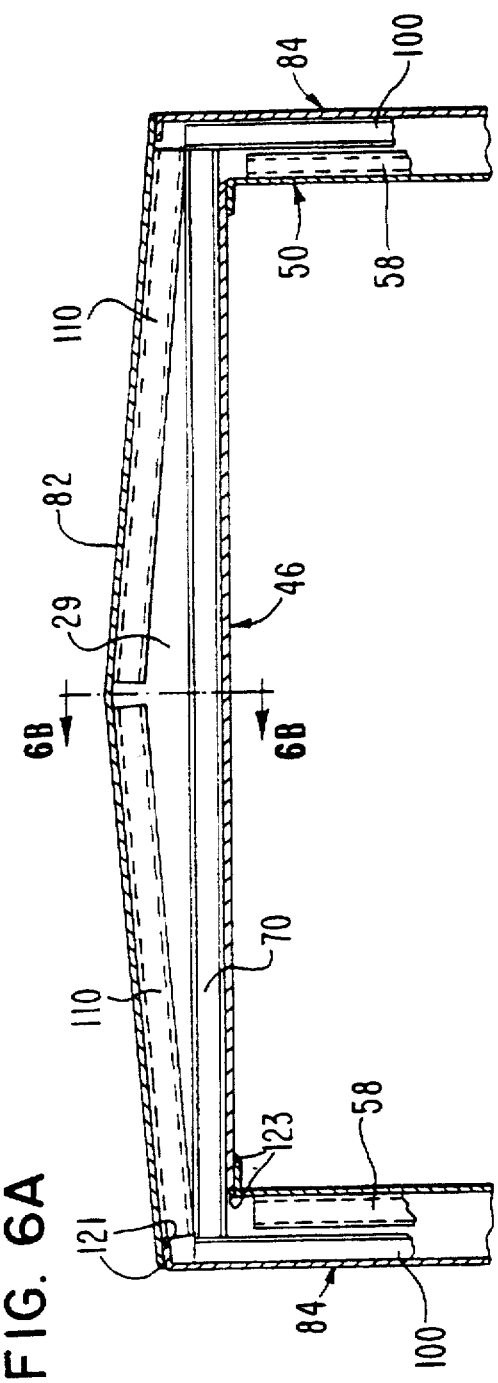
FIG. 6A is a fragmentary sectional view of the structure of FIG. 1 taken at line 6—6 of FIG. 1 and looking in the direction of the arrows.

As herein embodied and referring to the embodiment of FIG. 6A, roof skin 82 has a longitudinally extending peak 101 with lower longitudinally extending edges welded to an inwardly extending flange 102 (see FIG. 5A) of the outer sidewall skins 84 by a seam weld. A hip portion 106 of the roof skin 82 is at opposite ends of the peak 101 with lower edges extending substantially perpendicular to the peak, said lower edges of the roof skin are welded to the inwardly extending flange 102 at the upper edge of the outer enclosure endwall skins 92.

Figure 8B:
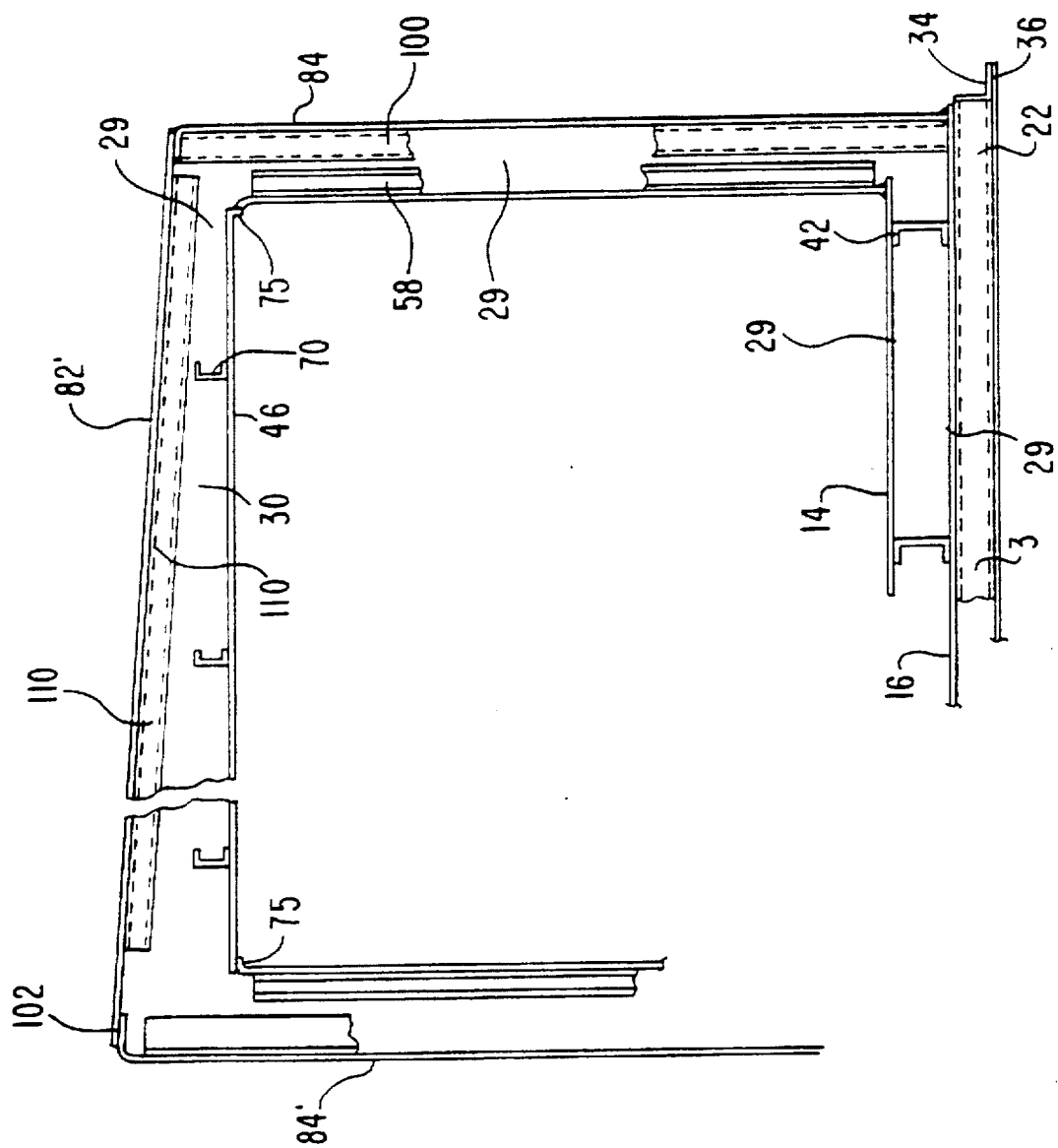
FIG. 8B is a fragmentary view similar to FIG. 8A except that it illustrates a second roof line embodiment construction according to the present invention.

As embodied herein and referring to FIG. 8B, roof skin 82' is a flat roof that slopes in the direction of the endwalls for water and snow to drain therefrom. An outer sidewall skin 84' is made longer than the opposite sidewall outer skin 84 to effect the slope.

Referring to FIG. 8C, inner sidewall skin 50 is bolted to inner stiffeners 58, and ceiling skin 46 is bolted to stiffeners 70 and the inner sidewall skins 50. For brevity, only a representative portion of the structure is illustrate. The spacing and size of the bolts or other mechanical fasteners will depend on the particular structure and application of the A plurality of spaced elongated metallic roof stiffeners having a U-shaped cross section are mounted to the inner surface of the roof skin 82. As shown in FIGS. 6A and 6B a first portion 110 of said plurality of roof stiffeners are fastened to the inner surface of the roof skin 82 and longitudinally spaced along opposite sides of the peak and a second plurality of the roof stiffeners 112 being at the hip roof portions 106. As shown in FIG. 8B, the plurality of roof stiffeners 110 are longitudinally spaced and extend perpendicular to the plane of the sidewalls 84 and 84'.

The structure of the present invention includes fire resistant and impact resistant barrier insulation material filling the space between the inner and outer metallic enclosures 44 and 45 and upper and lower decks 14 and 16. In one actual reduction to practice this space is approximately six inches between the inner and outer skins. The type of insulation between the inner and outer enclosures will depend on the location and intended use of the structure. However, it is contemplated that light weight concrete, which is made from a mixture of cement, water, and at least one of Perlite, Vermiculite, and Styrofoam, regular concrete, two-part polystyrene, or sand may be used as an insulating material. The thickness of the metallic skins, used for the inner and outer enclosures may vary from as thin as 18 gage through ½". The thickness of the steel sheets will depend on the overall volume of the structure and the density of the insulation material. For small size structures, using a very light insulation, such as styrofoam, for example, the skins may be as thin as 18 gage. For larger structures where the insulation is to be ordinary cement, the skins may be as thick as ½ inch.

The elongate stiffening members are offset longitudinally or laterally from one another, as the case may be, and extend into the space between the inner and outer enclosures approximately one-half the distance between the skins of the two enclosures in order that the continuous space between the enclosures is not unduly restricted, permits the insulation to be introduced after the structure is installed at the intended location, and provides substantial uniformity in the thickness of the barrier material between the inner and outer enclosures. Preferably, the offset of a stiffening member of an inner skin from an opposing outer skin stiffening member is at least as great as one-half the width of the space. The stiffening members 110 and 112 welded to the outer enclosures are preferably U-shaped in cross section and oriented so that the bight portion of the U is perpendicular to the plane of the skin of the roof.

A more detailed description of the first embodiment of the present invention is presented in connection with a description of its method of fabrication, which is described in connection with the previously described drawings and FIGS. 5A–5B, 6A–6B, 7A–7B, 8A, 8B, 8C, and 9A–9B.

In accordance with the present invention, the method of fabricating the portable structure 11 for housing sensitive equipment, comprises assembling the skid platform 12 including the upper and lower decks 14 and 16 by fabricating the lower deck from a metallic plate having a configuration and dimensions corresponding to the desired configuration of the structure 11 as seen in FIG. 1, then as shown in FIG. 2 and FIGS. 5A and 5B, fastening to the underside of the metallic deck, three pieces, preferably 3×4×5/16 inch rectangular metal tubing, parallel to and laterally spaced from one another, having a length corresponding to the desired length of the building. One of the lengths 26 is attached to the longitudinal center of the plate 16 by a weld, such as 111 along the length on opposite sides of the tube 26, and the other two 22 and 24 are attached to the underside of the lower deck 16 by a seam weld such as 111. The plate 16 is also welded to the tubes 22 and 24 by a seam weld 113 extending along the butt edge of plate 16 which is set back 5/16" from the outer surface of the tubes 22 and 24. The longitudinally spaced laterally extending cross members 28 are butt welded by full fillet welds at one end to opposite sides of the center tube 26 and at the opposite ends to the lengths of tubing 22 and 24 spaced from the center tubing.

Upper deck 14 is set back ⁵⁄₁₆' all around the perimeter of the skid frame base and is skip fillet welded to members 42 and 24 as shown at section 5B—5B of FIG. 5A. Members 42 are located at proper intervals and with the required set backs on the metal deck 16, then skip fillet welds are placed on both sides of the channel flange of member 42 to the upper deck 14 using staccato welds at appropriate intervals. Steel deck 14 is preferably ³⁄₁₆" thick is placed over the top flanges of members 42. Upper deck 14, is set back ⁵⁄₁₆" from each of the members 42. Top flanges of members 42 shall have a full fillet weld the full width of flanges. Steel deck 14 has ⅝" holes either drilled, bored, or burnt in at various intervals and along the top flange center lines of members 42. Steel deck 14 is then plug welded to top flanges of members 42. The clip angles 34, which for one application ¼"×3"×4"×4½" are welded all around to each end of steel tubes 22, 24, and 26. The top and bottom welds of the angle clips are ground flush with the steel tubes. Between deck 14 and 16 is a space of 6", which is to be filled with insulation material.

The sidewall and endwall skins are then welded at each corner by corner supports 78 with adjoining edges of the skins in abutting relationship. The upper edge of each inner sidewall and endwall skin is bent inwardly to form a an annular inwardly extending flange 75 around the periphery of the inner enclosure 44. The ceiling skin 46 is then welded to the peripheral flange by a continuous seam weld. As shown in FIG. 5A, the ceiling skin 46 is welded to the skins 50 and 52 by continuous seam welds 120 and 122 at the butt end of the flange 75 and the butt end of ceiling 46, respectively.

The inner enclosure walls and ceiling with their stiffeners and inner angle member may be constructed separately in another area, for example. Then, by a lifting device placed on the skid base 12, the walls and ceiling are positioned and tack welded in place; and then all seal welds may be made to the upper steel deck, inside and outside of sidewalls and endwalls 50 and 52, the full perimeter of the inner enclosure 44, as previously described in connection with FIG. 5A. However a full length × height end sections, corner members 78, stiffeners 58, door frames 59 and 61 with a door cut out of one sidewall 50 or endwall 52 or both ends if required. The endwall skins, may be welded with each endwall set on the skid base 12. A bottom seal weld is then made after the skins are properly located. Then a full length × height inner sidewall and endwall sections, with a door cut out of inner skin on one side or both sides in the sidewall sections, are welded together. Each sidewall section is placed on the skid base, tacked in place, then the bottom seal welds are made followed by the vertical corner seal. After being positioned, the bottom seal welds are made, the corner vertical welds are welded to the sidewalls and endwalls.

Then the ceiling is constructed using ceiling skin 46 and stiffeners 70, then the constructed ceiling is placed on top of the endwall and sidewall sections, and seal welded the full perimeter of the ceiling enclosure inside and out as previously described and shown in FIGS. 5A, 6A, and 8A. All wall and ceiling skins or deck where spliced together shall be butt welded on the interior side and fillet welded on the outside. Fillet welds shall be ground flush and all weld splatter removed. The stiffener members and column angles shall be skip welded on both sides throughout the required lengths.

Referring to FIGS. 6A and 6B, roof skin 82 is seal welded outside and inside by fillet welds 121 to outer skin 84. Both sides of the enclosure for its full length, is welded to roof skin 82. Also a seal weld 123 is provided outside and inside by fillet welds to inner skin 50 on both sides of the enclosure for its full length.

It was explained with reference to FIG. 5A as to how inner enclosure ceiling 46 can be constructed and placed in position, as well as the method of welding ceiling skin 46 and the stiffener members together. This method of welding ceiling skins and stiffeners together applies to the roof skin 82 and stiffeners ribs 110. The roof skin 82 with stiffeners 110 may be fabricated separately and set on top of the outer enclosure walls 84. Therefore, the outside enclosure endwalls and sidewalls 84 are preferably constructed and welded in place ready for the roof section 82 and stiffeners 110. The fabrication of the slanted roof embodiment as shown in FIG. 8B is similar to the fabrication of the alternate embodiment of FIG. 8A.

Referring to FIGS. 7A and 7B where 7B is view 7—7 of FIG. 1 through the enclosure corner column 2" below the top of column angle support 78 to illustrate how the 10 gage skin is constructed to column angle 78 and welded all around to the lower deck 16. As shown, the sidewall and endwall skins 50 and 52 and the legs of inner column 78 are skip welded on the inner surface of skins 50 and 52. Outside column 79 is seal welded to the inner surface of skins 84 and 92 vertically the full height of the skins; and the legs of column 79 are skip welded to the inner side of the outer skins by a fillet weld. Column 78 at the top is welded where contact is made with the inwardly extending formed flange of the sidewall and endwall skins. Tie column plates 81, which fit in the space between the inner and outer skins at each corner of the enclosure are welded to outer column 79, inner column 78, skins 84, 92, 50, and 52. This provides a rigid structure at each corner of the inner and outer enclosure without interrupting the continuity of the space between the inner and outer enclosures 44 and 45. Since, each tie column plate has an opening in the central portion to provide such continuity, blown or poured in insulation is better able to reach all parts of the space between the inner and outer enclosures after completion of the structure.

Referring to FIG. 8A, which is a sectional view 8—8 of FIG. 1, and FIG. 8B showing inner and outer walls with a fragmentary roof and ceiling section. The inner enclosure for some applications may be perforated metallic sheeting. For such applications, insulation material may be used for a sound barrier. Thus for sound attenuation, insulation can be of a pump fill, or blow fill (pellets), or fiber glass insulation sheets or the like, cut to size and placed in position while under construction. Insulation material 29 fills the space between the outer skin 84, 92 and the inner skin 50, 52 on both sides for the full length and full height of the walls as well as between the roof section and ceiling section. Any doors or access ports also include insulation between the inner and outer metallic skin.

Referring to FIGS. 9A and 9B, which illustrate a filler and vent cap 140 wherein a flat face flange female portion 142 is welded to roof skin 82, where required, before the roof section is put in place. A seal weld extends around female member 142 on the bottom side and on the top side. A male plug 144 is threadably attached to the member 142. Filler ports and caps 140 may also be placed at various locations for introducing the insulation after construction is completed.

Figure 10C:
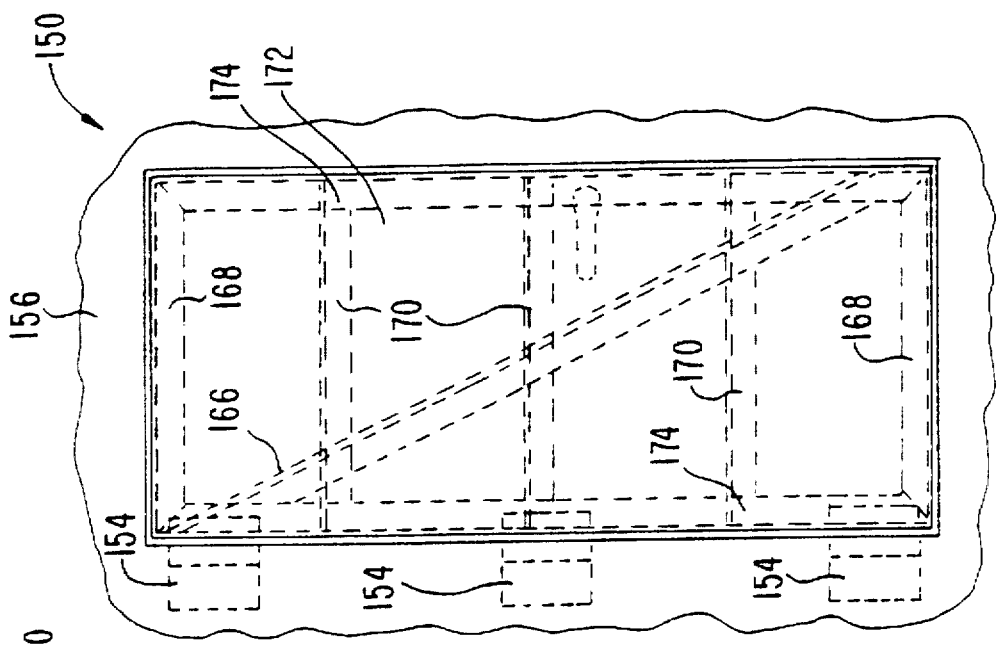
FIG. 10C is a view in elevation of the inside of the door of FIG. 10A.
Figure 10B:
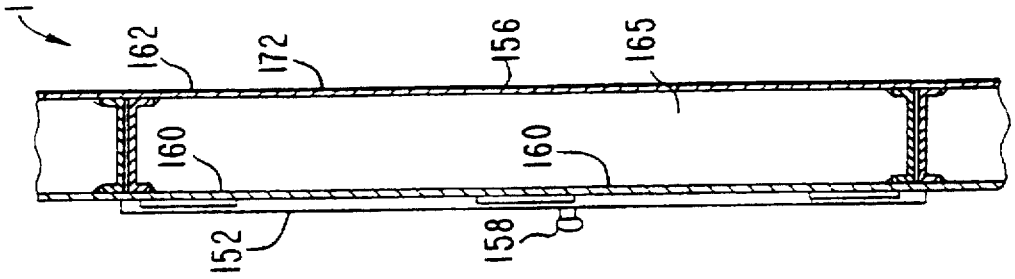
FIG. 10B is sectional view of FIG. 10A illustrating the door of FIG. 10A.
Figure 10A:
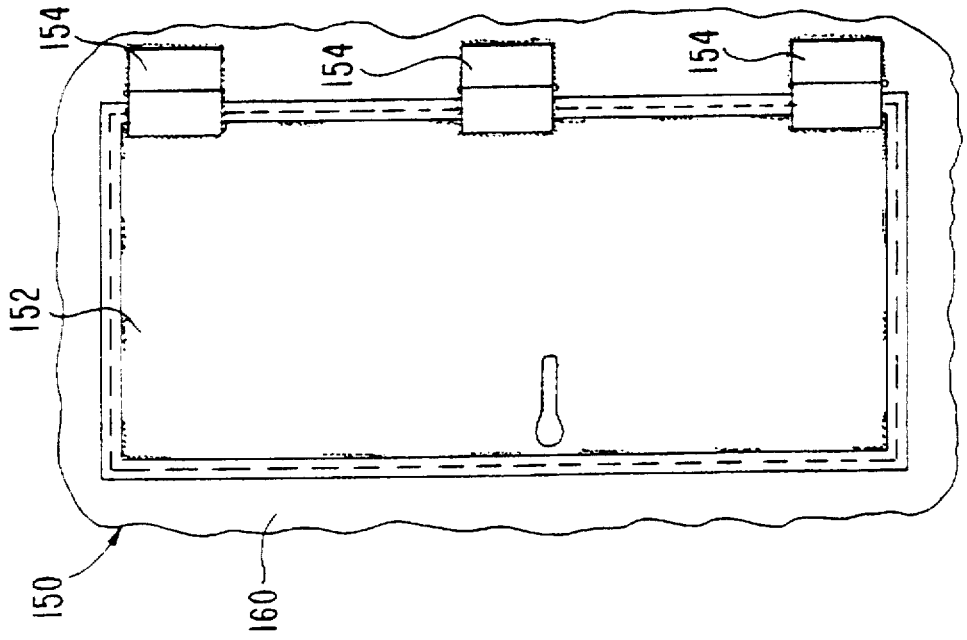
FIG. 10A is a view in elevation of the door for the structure of FIG. 1.

Referring to FIGS. 10A, 10B, and 10C which illustrate a door 150, which includes an outer door 152 which may be hung to swing outwardly left or right depending on the mounting of hinges 154. The door has an inner skin 156 which is the same thickness as the sidewall and endwall inner skins, a door lock handle 158, a striker block, (not shown) a neophrene seal ⅛"×1½" 36) an outer enclosure skin 160, inner enclosure skin 156, and the insulation material 29 between the inner and outer skin. Referring to FIG. 10C of the drawing which illustrates a back view of the door 150 which includes internal bracing 166, head and jam 168, and stiffeners 170, and door inner back skin 172. Corners of frame and diagonal sag channel members 174 are welded inside and outside. The outside weld is ground flush with the metal, with all sharp corners broken. Inner skin 156 has ½" plug weld holes along centers of the stiffeners 170 channel and the diagonal sag channel 174. The skin 160 is welded to the stiffeners 170.

In accordance with the present invention, a structure for certain applications where the communications equipment within the structure may substantially occupy the entire interior and may be accessed without requiring entry to the structure, includes a skid platform having spaced metallic upper and lower decks, and spaced inner and outer metallic enclosures mounted on the respective upper and lower decks, as described in connection with the first embodiment of the invention. However, in accordance with the second embodiment, the structure has a plurality of openings in its sidewalls and endwalls to accommodate covers or doors that are closed to securely house the equipment therein, and are opened to expose the housed equipment to be inspected and maintained. A plurality of covers or doors are pivotally installed in the plurality of openings so that when they are opened, they in fact extend the protective area of the structure so that when working on the equipment, both the equipment and the workers are protected from the weather. At least one of the plurality of doors is hung on a hinge to pivot about a horizontal axis that is adjacent to and extends parallel with the outer edge of the roof skin, and at least another of the plurality of doors is hung on a hinge to pivot about a vertical axis adjacent a corner of the structure.

As embodied herein and referring to FIGS. 11–16A, 16B, 16C, a structure generally referred to as 211 has a skid platform 212, comprising an upper deck 214 and a lower deck 216 welded to a plurality of longitudinally extending support members 218 which are preferably tubular in cross section and spaced from another sufficient to prevent the skid platform 212 from warping in response to the tremendous weight of outwardly extending side covers or doors hereinafter described. A sheet of plywood 220 is secured to and overlays the upper deck to provide a non-conductive surface between installed equipment and the upper deck 214. According to one proposed reduction to practice, all of the metallic material is hot rolled steel. For example, the upper and lower decks are made of 3/16" hot rolled steel, the support members, which are preferably tubular and rectangular in cross section are 3" deep, and the plywood is 1½" thick. The structure 211 has an outer enclosure 222 and an inner enclosure 224 that is structured similar to that described in connection with the first embodiment, except that the inner and outer enclosures are dimensioned to provide approximately a 3" space therebetween.

Referring to FIG. 13A, the structure includes inner sidewall skins 226, outer sidewall skins 228, inner and outer endwall skins 230 and 232, roof skin 234, and ceiling skin 236, which are preferably constructed of 3/16" sheet steel for a structure of the size shown. In FIG. 13A the roof skin 234 has a center peak for permitting water to drain off the surface of the roof. Referring to FIG. 13B, a ceiling skin 236' is fastened to the inner and outer sidewall skins at the upper edge with an overhang on opposite sides to define an eave. Along one side of the eave a 3" by 4" tubular element 235' is attached to the ceiling skin 236' along its 4" side. On the opposite edge of the ceiling skin 236' a tubular element 235' is fastened to the ceiling skin at its 3" side. Thus, roof skin 234' is fastened on each of the tubular elements 235'. The roof skin because of the orientation of the tubular members is slanted for draining water therefrom.

Stiffeners, such as Z bars, which are 2" wide by 3" in height, are welded to the various wall, ceiling and roof skins. In the second embodiment, and referring to FIG. 16 each Z bar 302 is welded or bolted to the inner and outer skins of the enclosure to provide the required stiffening and maintain uniform space between the inner and outer enclosures. The number and spacing of the Z bars depends on the unbroken surface area, in which they are used. FIG. 16C shows a Z bar 302 bolted by a series of spaced bolts 304 (only one bolt 304 is shown) to the inner skin 226, and welded to the outer skin 228. However, the Z bar may be welded to either or both the inner and outer skin, or bolted to either or both the inner skin depending on the particular application of the structure.

The construction of the various openings in the structure 211 is shown in FIG. 16B wherein an elongated tubular member 306 has fastened thereto on opposite sides an inner skin 226 and an outer skin 228. The skins may be welded or bolted depending on the application of the structure. In FIG. 16B, the inner skin 226 is fastened by a series of spaced bolts (only one shown) 304 and the outer skin 228 is welded to the tubular member 306. However, depending its particular use, either on or both of the inner and outer skins may be welded or bolted to the tubular member 306. To make a corner junction as shown in FIG. 16A, inner and outer skins 226 are fastened to opposite sides of the tubular members 306 as described in connection with FIG. 16B, then another tubular member having inner skin 226 and outer skin 228 fastened to opposite sides thereof is fastened by its skin 226 to a third side 310 of the tubular member. Here again the one tube and skin assembly may be welded and/or bolted.

Figure 11:
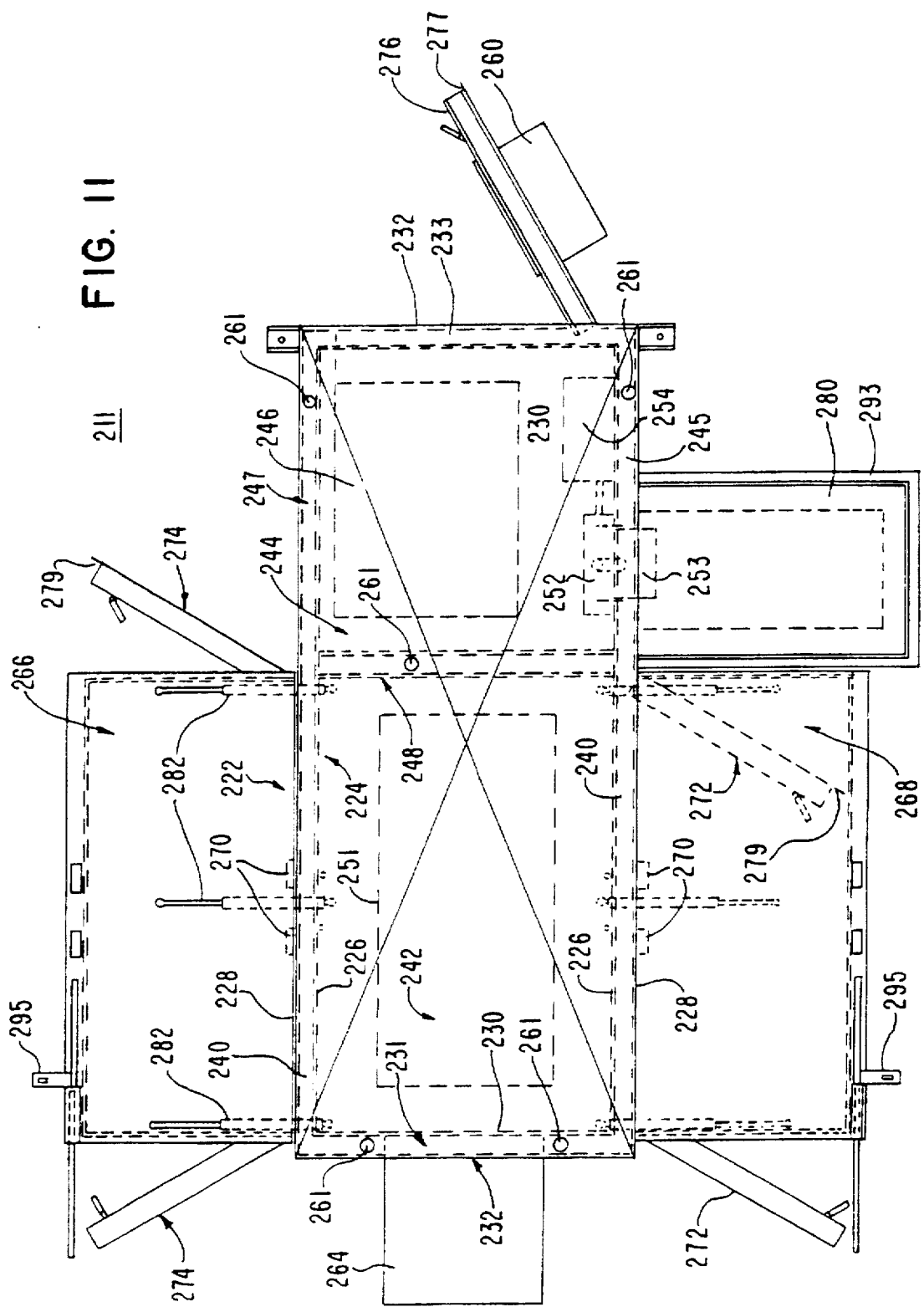
FIG. 11 is a plan view of a structure according to a second embodiment of the invention, with access doors in an open position, for inspecting housing telecommunication equipment contained therein.
Figure 12:
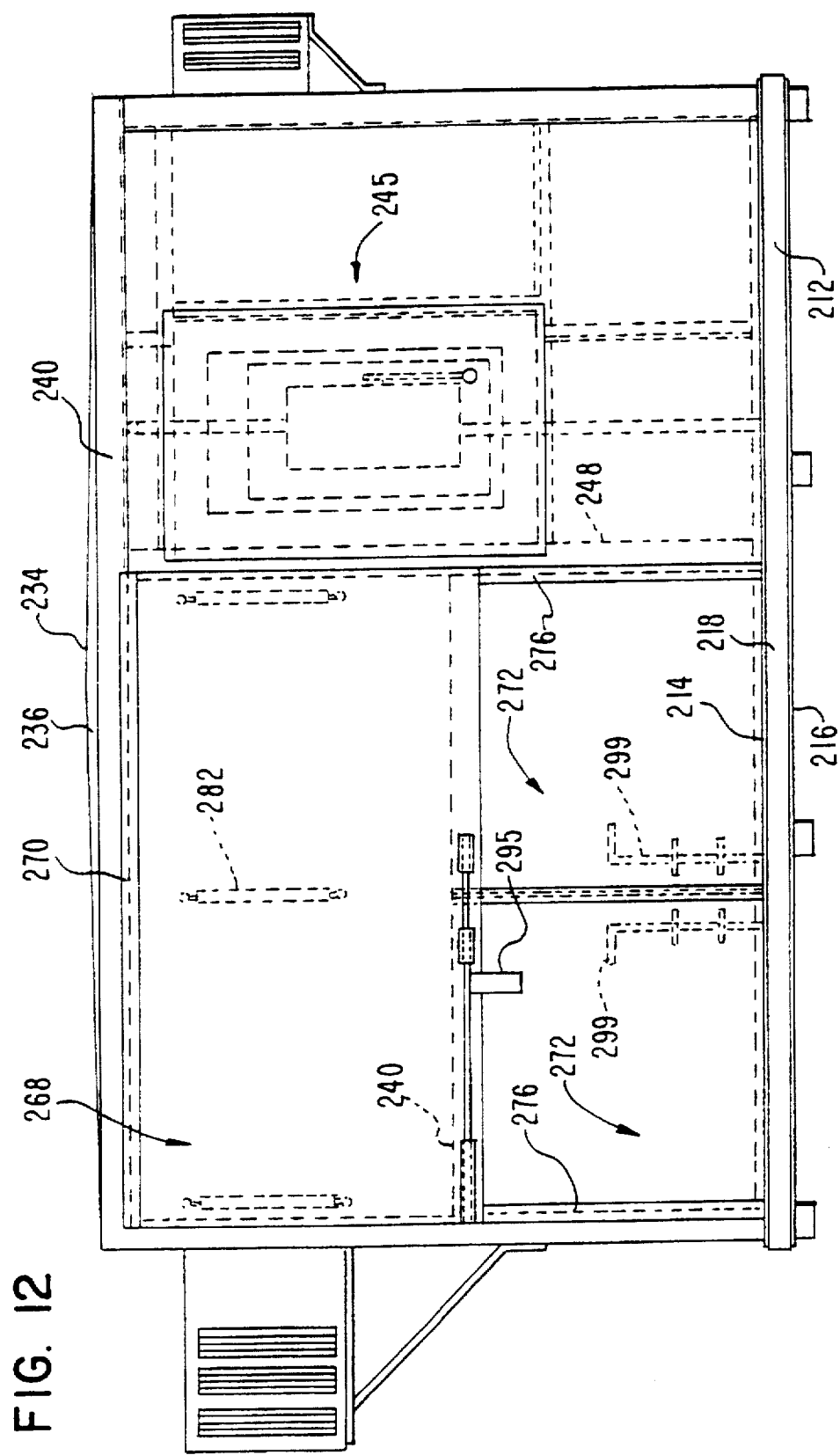
FIG. 12 is an elevational side view of the structure of FIG. 11 with the access doors in a closed position.

The interior of the structure 211 as shown in FIG. 11, has a telecommunication equipment room 242 in which is located telecommunication equipment referred to by dashed lines 243, and an adjoining battery room 244. The equipment illustrated by the dashed lines 243 is the telecommunications equipment that is required for the successful operation of a base station of a cellular, satellite, or personal communication equipment. In the battery room 244 is a battery cabinet 246 for containing batteries for use in the event of power failure. The rooms or compartments 242 and 244 are separated by a partition 248 that comprises spaced parallel skins that are welded or bolted preferably to tubular stiffening members 250, which in turn are welded or bolted to the inner sidewalls 226. The opposite sides of the equipment room 242 are completely open. In other words, the access openings on each side of the structure 211 extend from the deck 214 to the ceiling 240 in height and from the left endwall 232 to the partition 248 in width. The opposite ends of the equipment room 242 defined by endwall 231 and partition 248 have no openings except for the opening to accommodate climate control apparatus 264.

The metallic sidewall portion 245 within the battery room area has an opening to accommodate a main two hundred ampere circuit breaker 252 to receive 240 volts of AC power from an external source. Individual circuit breakers on the panel are also accessible from the exterior of the structure 211. A surge arrestor 254 is connected to the main circuit breaker 252 and preferably bolted to the sidewall of the inner enclosure out of registry with the opening accommodating the main circuit breaker 252 in order to protect the installed communications equipment. The opening that exposes the circuit breaker occupies approximately ⅓ the area of one entire sidewall 245 of the battery room. Opposite sidewall 247 of the battery room has no openings. Thus, the open sidewall of the equipment room adjacent the sidewall 247 of the battery room occupies about ⅔ the entire one side area of the structure 211. At opposite ends of the structure 211 are two climate control combination air conditioning and heating units 260 and 264 permanently mounted in framed openings. Unit 260, which may be a 4000 BTU air conditioning unit, is mounted in a door in the end opening into the battery room 244 to keep the batteries at an appropriate temperature and humidity. Unit 264 is mounted in an opening in the endwall at the left end of the structure as viewed in FIGS. 11 and 12 to maintain the equipment room 242 at the proper temperature and humidity. The right endwall 233 of the structure 211 has a large opening that extends substantially the entire width and height of the endwall.

The perimeter of each of the openings are defined preferably by tubular members 240 that are welded or bolted to the inside of the outer skin 228 and the outside of the inner skin 226. The perimeters of the openings at opposite sides of the equipment room 242 and the endwall of the battery room 233 include tubular members 240 of rectangular cross-section that are welded or bolted together to form a framework. The framework defines the openings. An inner and outer skin is welded or bolted to the members 240 to define one fixed endwall 231. Inner and outer sidewall skins are welded or bolted to the members 240 to form one sidewall of the battery room without any openings therein, and inner and outer sidewall skins are welded or bolted to the framework to form the opposite sidewall of the battery room having the opening that exposes the main circuit breaker and AC disconnect. The fixed sidewalls 222 and endwalls 231 233 and roof skin 254 have openings 261 into which the appropriate insulation is introduced to fill the space between the inner and outer enclosures.

The doors of the present invention each have a framework of tubular members of the same size and type as those that define the perimeter of the openings. Sheet metal skins of the thickness used for other parts of the structure are welded by a seam weld or bolted along opposite sides of the frame of rectangular tubular members to form the individual double wall doors. Each of the doors has one or more openings for introducing insulation in the space between the inner and outer skins.

As shown in FIG. 11, the battery room 244 has an access door 276 to which is mounted the battery room air conditioner and/or heater 260 that is hung on a hinge to swing on a vertical axis at the right end of the structure as viewed in the drawing. Covering the main circuit breaker 252 and an AC connect/disconnect receptacle is a door 280 that is hung on a hinge to swings outward and upward on a horizontal axis to expose the main high voltage circuit breaker.

Figure 14:
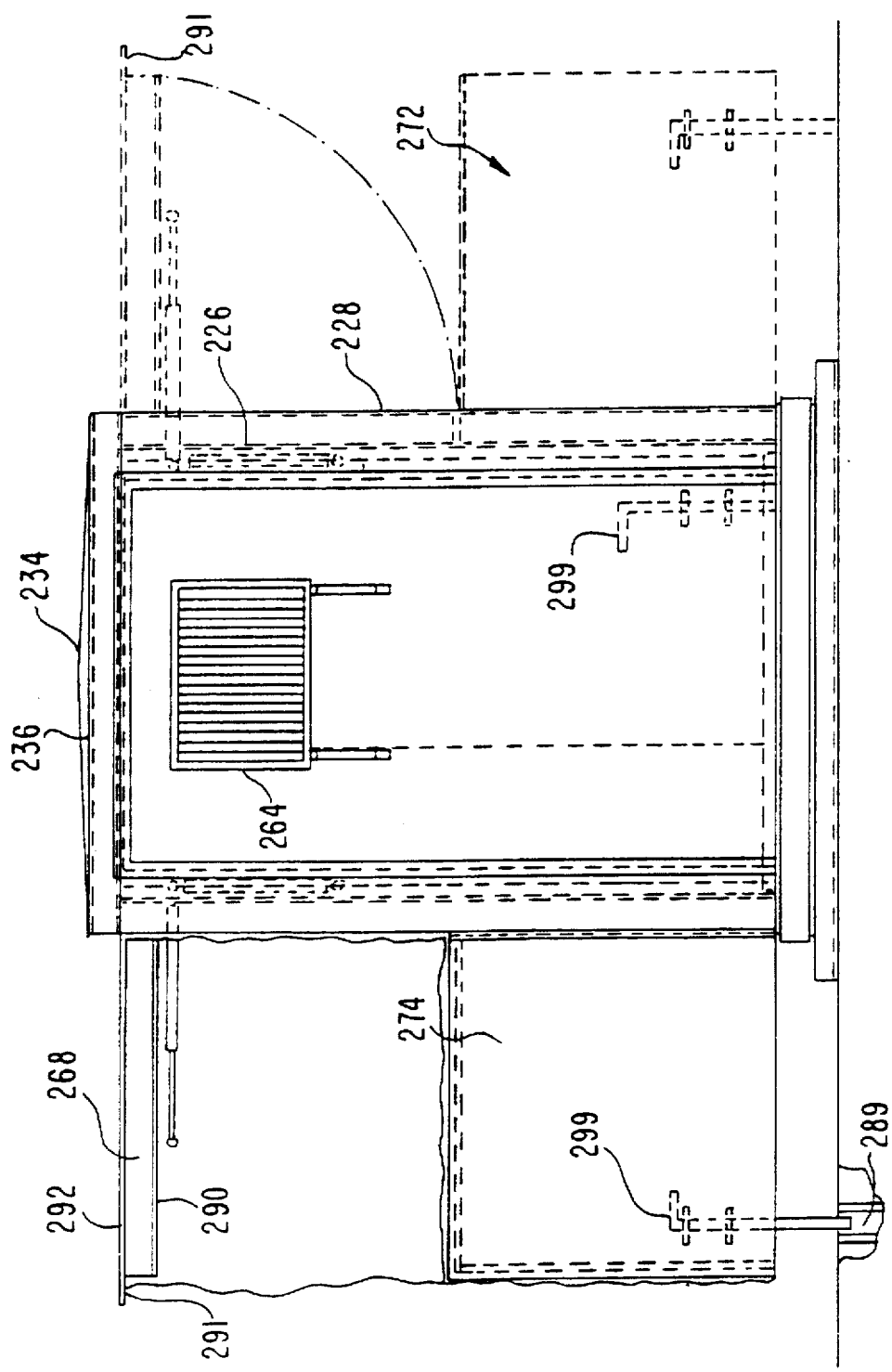
FIG. 14 is a view in elevation of the left end of the structure as viewed in FIGS. 11 and 12.
Figure 15:
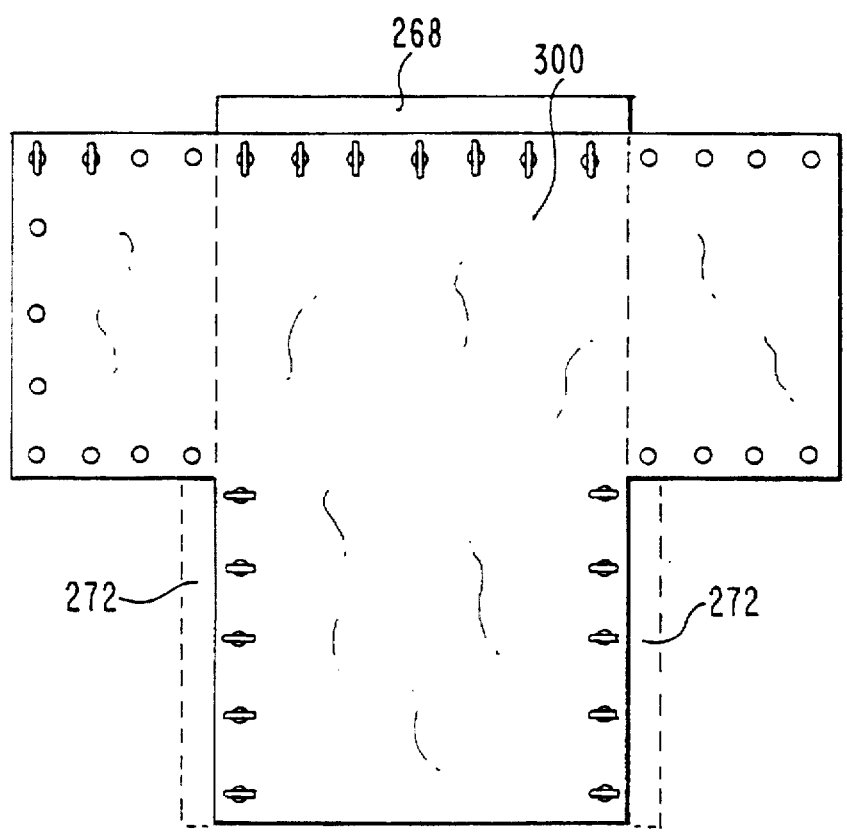
FIG. 15 shows the configuration of a canvass cover for enclosing the sides of the structure of FIGS. 11-14 to provide an enclosed room addition at opposite sides of the structure for inspecting and servicing the equipment.

The outer skins of each of the doors 266, 268, each have an outer skin that is larger in area than the inner skin to form an external flange 291 as best seen in FIG. 14. The door 280 has an external flange formed by an angle member 293 welded to the outer perimeter of the door. The endwall door 276 has an outer skin larger than the inner skin to form a flange 277 around the perimeter. One of each of the pair of doors 272 and 274 has a flange 279 extending parallel to the vertical axis at the opposite edge of the door.

As herein embodied and referring again to FIGS. 11–14, doors 266 and 268 hang on hinges 270 adjacent the outer edge of the roof skin 234 and have a height dimension so that the bottom of each of the doors 266, 268 cover a portion of their respective openings about midway between the roof 234 and the deck 214, and have a length that extends the entire length of the opening of the equipment room 242. The doors 266 and 268 swing outward and upward on a horizontal axis to expose both sides of the upper half of the equipment room. Below each of the doors 266 and 268 are a pair of doors 272 and 274, which hinge on a vertical axis 276 at opposite ends of the equipment room 242. The doors 272 and 274 open outwardly from the center of the equipment room 242 to expose the lower portion of the entire equipment room. The doors 266, 268, and 280 are held in their open position at an angle of approximately 90 degrees to the sidewalls of the structure by heavy duty gas cylinders, referred to at 282.

When both the doors 266 and 268 are open approximately 90 degrees, both of the entire sides of the equipment room are also open with the two doors forming a roof for protecting the equipment from the weather.then cane bolts 299 are lifted upwardly to release the lower doors 272 and 274. These doors 272, 274 swing outwardly from the center to uncover the remainder of the opening and provide protection from each side of the opening. The doors 272 and 274 when opened are held in the open position by cane bolts 299 which are inserted in an opening 289 formed in a concrete base on which the structure 211 is supported. In order to complete the sheltered addition formed by the open doors 266, 268, 272, and 274, a piece of canvas or other waterproof covering 300 is attached to and suspended from the doors 266 and 268 along both sides and the length of the door. The canvas is long enough to reach the cement slab on which the structure is mounted and fastened at opposite ends to the lower doors 272 and 274, thus forming a closed addition which is impervious to inclement weather and curiosity seekers. To close and lock the doors, the lower doors 272, 274 are first closed. Note that one of the doors of the pair 272 and 274 has an outer skin with a flange on the outer skin the extends over the edge of the other of the doors 272, 274 when closed. After the lower doors are both closed, the upper doors, 266 and 268 are lowered. When closed the outer skin flange overlaps the upper edge of the doors 272 and 274, thus preventing the opening of the lower doors. A lock hasp 295 is then secured to one of the lower doors 272, 274 to lock the three doors on each side of the structure.

As shown in FIG. 14, the door 280 has an inwardly extending peripheral flange portion 293 which engages the portion of the sidewall surrounding the AC power main circuit breaker with the central portion being spaced from the AC disconnect portion 253 which extends outwardly from the outer sidewall. An opening may be formed in any convenient location of the structure for connecting the equipment in the structure to an external antenna.

Thus, in the second embodiment when all of the doors are closed, the structure is sealed so that the housed equipment is fully protected from the elements by the insulation filled doors, double walled sealed sides and roof; and when the doors are opened, the telecommunications equipment is fully accessible on both sides from a room addition formed by the open doors.

It will be apparent to those skilled in the art that various modifications and variations can be made in the apparatus and method of the present invention without departing from the period or scope of the invention. Thus it is intended that the present invention cover the modifications and variations of this invention provided they come within the scope of the appended claims and their equivalents.

What is claimed is:

1. A portable structure for housing sensitive equipment, comprising:
    a skid platform having metallic spaced upper and lower decks with opposite side edges and a forward and rear edge;
    an inner enclosure having an inner metallic skin, including a planar ceiling skin, opposite planar sidewall skins fastened to the ceiling skin along an upper edge and fastened to the deck along a lower edge, opposite end wall skins fastened to the ceiling skin along an upper edge and fastened to the upper deck along a lower edge;
    an outer enclosure having an outer metallic skin, including a roof skin, opposite outer planar sidewall skins fastened to the roof skin along an upper edge and fastened to the lower deck along a lower edge, opposite outer end wall skins welded to the roof skin at an upper edge and welded to the lower deck at a lower edge enclosing and spaced from the planar ceiling skin, the opposite inner planar sidewall skins, and the opposite inner end wall skins, respectively, of the inner metallic enclosure;
    stiffening means for stiffening the inner and outer enclosures independently of one another, including
    first means mounted to the inner metallic skins in the space between the inner and outer enclosures for stiffening the inner metallic skins,
    second means mounted to the outer metallic skins in the space between the inner and outer enclosures and spaced from the inner stiffening means for stiffening the outer metallic skins; and
    barrier material occupying the space between the inner and outer metallic enclosures and upper and lower decks.

2. The structure of claim 1 wherein the stiffening means comprises:
    a plurality of spaced stiffening members mounted to the inner sidewall and endwall skins and outer sidewall and endwall skins between and spaced from the upper and lower edges of the respective inner and outer sidewall and endwall skins.

3. The structure of claim 2 wherein the stiffening means further includes:
    an inside corner column mounted to cover each corner junction of the inner and outer sidewalls and endwalls, each said column extending below the lower edge of the respective inner and outer sidewalls and endwalls in supporting engagement with the lower deck.

4. The structure of claim 1 wherein the metallic lower deck of the skid platform, comprises:
    a lower metallic plate having a bottom and top surface and thickness of approximately one quarter inch;
    a pair of longitudinally extending steel tubes (3×4 ×5/16) fixed to the bottom surface of said plate and defining the opposite side edges,
    a third longitudinally extending steel tube fixed to the bottom surface of the plate intermediate and parallel to the pair of steel tubes,
    a plurality of laterally extending steel tubes spaced in a longitudinal direction between the forward and rear edge on opposite sides of the third steel tube;
    a member attached to each end of the pair and third longitudinal tubes for fastening to a base; and
    an insulation strip fastened to an underside of each of said longitudinal and lateral tubes and angle clip to insulate the building from ground.

5. The structure of claim 1 wherein the metallic upper deck of the skid platform comprises:
    an upper metallic plate having a thickness no greater than the lower metallic plate, and a top and bottom surface, said metallic plate having a longitudinal and lateral dimension less than the corresponding dimensions of the lower deck by an amount corresponding to the space between the inner and outer sidewall and endwall skins;
    a plurality of laterally extending longitudinally spaced metallic stiffening members mounted to the bottom surface of the upper metallic plate and the top surface of the lower metallic plate, said plurality of stiffening members having a length dimension corresponding to the width dimension of the upper metallic plate and being mounted centrally above said lower plate, said stiffening members being dimensioned to provide a space between the upper and lower decks corresponding to the space between the sidewalls and endwalls of the inner and outer enclosures.

6. The structure of claim 1 wherein the first stiffening means comprises:
    a plurality of vertically extending longitudinally spaced metallic stiffening members mounted to the outer surface of the inner sidewall and endwall skins, said stiffening members each having opposite ends terminating inwardly of the upper and lower edges of the sidewall and endwall skins and a depth dimension approximately one-half the width of the space between the inner and outer enclosures;
    a plurality of laterally extending longitudinally spaced metallic stiffening members mounted to an outer surface of the planar ceiling skin and overhanging opposite edges of the ceiling skin and the opposite inner sidewall skins a distance corresponding to the depth of the vertical sidewall stiffening members; and
    inner enclosure corner supports attached to the outer surface of the sidewall and endwall skins at each corner of the inner enclosure, the plurality of attached corner supports having one end attached to the top surface of the lower deck.

7. The structure of claim 5 further comprising:
    a metallic door frame having a depth corresponding to the space between the inner and outer enclosures fastened to the outer surface of the inner skin, said inner skin having an opening defined by the door frame.

8. The structure of claim 1 wherein the second stiffening means comprises:
    a plurality of vertically extending longitudinally spaced metallic stiffening members mounted to the inner surface of the outer sidewall and endwall skins, said plurality of outer metallic stiffening members having one end terminating at the top surface of the upper deck and another end terminating inwardly of the upper edge of the outer sidewall and endwall skins, said outer enclosure stiffening members having a depth of approximately one-half the width of the space between the inner and outer enclosure;
    a roof skin having longitudinally extending edges fastened along the upper edge of the outer enclosure sidewall and endwall skins; and
    a plurality of spaced metallic roof stiffeners mounted to the inner surface of the roof skin.

9. The structure of claim 1 wherein the stiffening means comprises:
    a plurality of elongate metallic members having a u-shaped configuration in cross section.

10. The structure of claim 1 wherein the inner and outer metallic skins have a thickness of 10 gauge.

11. The structure of claim 2 wherein the first and second plurality of stiffening members are each u-shaped in cross section and attached to the skin by one leg of the u-shaped stiffening member.

12. A method of fabricating a portable structure for housing sensitive equipment, comprising the steps of:

assembling an upper and lower deck for supporting the structure, said step of assembling the upper and lower decks including the substeps of:

arranging at least three pieces of 3×4 inch metallic tubing, having a length corresponding to the desired length of the outer surface of the structure, parallel to and laterally spaced from one another to define the width of the outer surface of the building;

fastening one end of a plurality of longitudinally spaced laterally extending cross members to opposite sides of a center one of the three lengths of tubing and another end of said cross members to adjacent second and third lengths of the three lengths of tubing spaced from the center tubing to construct a frame;

fastening a first metallic plate, having dimensions corresponding to the length and width of the frame, to the frame so that outer edges of the first welded plate are substantially flush with outer edges of the frame, said first metal plate constituting a lower deck;

attaching a strip of insulation to the tubes of the frame opposite the first metallic plate;

fastening a plurality of longitudinally spaced elongate metallic u-shaped members of equal length and depth to an upper surface of the lower deck, said members having a length in accordance with the width of the inner surface of the building;

fastening a second metallic plate to the plurality of elongate members fastened to the lower deck, said second metallic plate being thinner than said first metallic plate and having a length and width corresponding to the length and width of an inner surface of the structure, said second metallic plate being positioned centrally of the first metal plate with edges of the second metal plate being substantially equidistant inwardly from corresponding edges of the first metal plate, said second metal plate constituting an upper deck;

assembling an inner enclosure, said step of assembling the inner enclosure comprising the substeps of:

fastening each of a plurality of longitudinally spaced u-shaped inner wall stiffening members having a length less than the height of the inner enclosure to a surface of a pair of sidewall metallic skins and a pair of endwall metallic skins so that opposite ends of the stiffening members terminate inwardly of upper and lower edges of the wall skins, said wall skins including sidewall skins having a length dimension corresponding to the length of the inner enclosure and endwall skins having a length dimension corresponding to the width of the inner enclosure, the width of the wall skins corresponding to the height of the inner enclosure.

fastening a plurality of laterally extending longitudinally spaced metallic u-shaped ceiling stiffening members to a ceiling skin, said metallic ceiling skin having a length dimension and width dimension corresponding to the length and width of the inner enclosure, each said ceiling stiffening members having opposite ends extending beyond the width of the ceiling skin a distance of approximately one-half the width of the space between the inner and outer enclosure, fastening edges of the ceiling skin having the length and width dimension to corresponding edges of the respective sidewall and endwall skins so that the wall stiffening members and ceiling stiffening members are on an outer surface of the inner enclosure, fastening inner enclosure corner supports to the outer surface of the sidewall and endwall skins at each corner of the inner enclosure, the plurality of attached corner supports having an upper end terminating adjacent the edges of the wall skins fastened to the ceiling skins and a lower end terminating beyond the upper deck a distance corresponding to the lower deck;

fastening the inner enclosure to the upper and lower decks, said step of fastening the inner enclosure to the upper and lower decks, comprising the substeps of:

fastening the edges of the wall skins, opposite the edges fastened to the ceiling skin, along the edges of the upper deck, fastening the lower end of each of the inner enclosure corner supports to the lower deck;

assembling the outer enclosure, said step of assembling the outer enclosure comprising the substeps of:

fastening each of a plurality of longitudinally spaced u-shaped outer wall stiffening members having a length less than the height of the inner enclosure to a surface of a pair of outer sidewall metallic skins and a pair of outer endwall metallic skins so that opposite ends of the stiffening members terminate inwardly of upper and lower edges of the outer wall skins, said outer wall skins including outer sidewall skins having a length dimension corresponding to the length of the outer enclosure and outer endwall skins having a length dimension corresponding to the width of the outer enclosure, the width of the wall skins corresponding to the height of the outer edges of the outer enclosure, fastening a plurality of laterally extending longitudinally spaced metallic u-shaped roof stiffening members to a roof skin, said metallic roof skin having a length dimension and width dimension corresponding to the length and width of the outer enclosure, each said roof stiffening members having opposite ends extending beyond the width of the inner enclosure a distance of approximately one-half the width of the space between the inner and outer enclosure, fastening edges of the roof skin having the length and width dimension to corresponding edges of the respective outer sidewall and endwall skins so that the outerwall stiffening members and roof stiffening members are on an inner surface of the outer enclosure, fastening outer enclosure corner supports to the inner surface of the outer sidewall and endwall skins at each corner of the outer enclosure, the plurality of attached outer enclosure corner supports having an upper end terminating adjacent the edges of the wall skins welded to the roof skins and a lower end terminating a distance corresponding to the lower deck;

fastening the outer enclosure to the inner enclosure, said step of fastening the outer enclosure to the inner enclosure comprises the substeps of:

positioning the outer and inner enclosures relative to one another so that the inner enclosure is inside the outer enclosure and the lower edges of the outer enclosure are supported by the lower deck, fastening the lower edges of the outer enclosure to the outer edges of the lower deck; and filling the space between the lower and upper decks and the inner and outer wall, ceiling, and roof skins with barrier insulation.

13. A method of fabricating a portable structure for housing communications equipment, comprising the steps of:

assembling upper and lower spaced decks for supporting the building, said upper deck having a thickness less than the lower deck and peripheral edges corresponding to the peripheral edge of an inner enclosure, said lower deck having peripheral edges corresponding to an outer enclosure;

stiffening an inner enclosure comprised of metallic ceiling and inner wall skins having a thickness less than the upper deck;

fastening the ceiling and wall skins to one another adjacent their edges with a continuous weld to form an inner enclosure with sealed ceiling and inner wall skins;

stiffening an outer enclosure comprised of roof and outer wall skins having a thickness less than the upper deck;

fastening the roof skin and outer wall skins to one another to form an outer enclosure with sealed wall and roof skins;

fastening the lower edges of the inner wall skins to the upper deck with a continuous weld to seal the inner enclosure to the upper deck;

lowering the outer enclosure over the inner enclosure to align the lower edges of the outer wall skins with the lower deck; and fastening the lower edge of the outer wall skins to the lower deck to seal the outer enclosure to the lower deck; and filling a space between the lower and upper decks and the inner and outer wall, ceiling, and roof skins with a barrier insulation.

14. A portable structure for housing telecommunications equipment, comprising:

a skid platform having metallic spaced upper and lower decks with opposite side edges and a forward and rear edge;

an inner enclosure including the skid platform having an inner metallic skin, with opposite sidewall skins fastened together;

an outer enclosure having an outer metallic skin, including a roof skin, opposite outer sidewall skins, and the skid platform fastened together and covering and spaced from the inner enclosure to form a double walled enclosure;

means mounted to the inner and outer metallic skins in the space between the inner and outer enclosures for stiffening the inner and outer metallic skins of the double walled enclosure;

a partition fastened to the opposite inner sidewall skins intermediate the ends of the double walled enclosure to define a battery room on one side of the partition and a telecommunication equipment room at the other side of the partition.

the opposite sidewalls of the double walled enclosure being open substantially the full length and height of the defined telecommunication equipment room;

a first double walled door covering a portion of the opening the full length of the equipment room, said door being mounted at an upper edge of the first door to swing outward and upward on a horizontal axis to an open position, a pair of double walled doors each mounted to swing about a vertical axis covering the remaining portion of each of the openings, said doors extending outward at opposite ends of the equipment room substantially aligned with opposite side edges of the first double walled door when open, said doors when open defining a shelter on opposite sides of the double walled enclosure for accessing telecommunications equipment; and insulating material occupying the space between the inner and outer metallic enclosures.

15. The structure of claim 14 wherein the double walled structure has an endwall defining a wall of the battery room, said endwall having an opening extending substantially the full width and height of the endwall; and a double walled door mounted to pivot about a vertical axis for accessing the battery room.

16. The structure of claim 14 wherein one of the sidewalls has an opening in the battery room; said battery room having a main circuit breaker and AC voltage disconnect accessible from outside said structure at said opening; and a double walled cover mounted to pivot about a horizontal axis to cover and uncover the circuit breaker and AC disconnect for operating the breaker and disconnect from a location outside the battery room.

17. The structure of claim 14 further comprising a piece of water resistant material detachably mounted to the open first door around the length and side edges and suspending downwardly to the ground and attached to the second pair of doors in the open position to complete an addition to the structure.

* * * * *